US012274243B2

(12) United States Patent
Bermudez Contreras et al.

(10) Patent No.: US 12,274,243 B2
(45) Date of Patent: Apr. 15, 2025

(54) SYSTEMS AND METHODS OF HOMECAGE MONITORING

(71) Applicant: Neurocage Systems Ltd., Lethbridge (CA)

(72) Inventors: Edgar Josue Bermudez Contreras, Lethbridge (CA); Robert James Sutherland, Lethbridge (CA); Majid Mohajerani, Lethbridge (CA); Surjeet Singh, Lethbridge (CA)

(73) Assignee: Neurocage Systems Ltd., Lethbridge (CA)

( * ) Notice: Subject to any disclaimer, the term of this patent is extended or adjusted under 35 U.S.C. 154(b) by 424 days.

(21) Appl. No.: 16/894,218

(22) Filed: Jun. 5, 2020

(65) Prior Publication Data

US 2020/0383299 A1    Dec. 10, 2020

Related U.S. Application Data

(60) Provisional application No. 62/857,879, filed on Jun. 6, 2019.

(51) Int. Cl.
*A01K 29/00* (2006.01)
*G06F 18/2413* (2023.01)
(Continued)

(52) U.S. Cl.
CPC ............ *A01K 29/005* (2013.01); *G06V 10/82* (2022.01); *G06V 20/52* (2022.01); *G06V 40/10* (2022.01); *G06V 40/20* (2022.01)

(58) Field of Classification Search
CPC .... A01K 29/005; A01K 11/006; A01K 1/031; A01K 15/02; A01K 2267/0356; A01K 1/0245; A61B 5/7264; A61B 2503/40; A61B 2503/42; A61B 5/1123; G06V 40/10; G06V 40/20; G06V 10/82; G06V 10/764;
(Continued)

(56) References Cited

U.S. PATENT DOCUMENTS 8,522,721 B2    9/2013   Bernardini et al.
9,986,716 B1    6/2018   Betts-Lacroix
(Continued)

OTHER PUBLICATIONS

Singh et al., "Low-Cost Solution for Rodent Home-Cage Behaviour Monitoring", bioRxiv, Jun. 8, 2018, 32 pages.
(Continued)

*Primary Examiner* — Morgan T Jordan
(74) *Attorney, Agent, or Firm* — Holzer Patel Drennan

(57) ABSTRACT

Computer controlled systems and methods of an automated homecage monitoring system predict a state of an animal and of its homecage. The prediction of the state of the animal may be based on a pose estimate of the animal, and at least one sensor input from an at least one sensor. The pose estimate may include a graph of connected nodes, the nodes representing coordinates of the sensor input corresponding to predicted indicia on the animal's body. The animal state may include a behavioral state of an animal, a social state of an animal, a position state of an animal, a sleep state of an animal, and a biological state of an animal. The automated homecage monitoring system may allow for animal state data to be reported for an animal or animals in situ.

14 Claims, 31 Drawing Sheets

(51) Int. Cl.
*G06V 10/82* (2022.01)
*G06V 20/52* (2022.01)
*G06V 40/10* (2022.01)
*G06V 40/20* (2022.01)

(58) Field of Classification Search
CPC ............. G06T 7/20; G06T 2207/30004; G06T 2207/20084
USPC .......................... 119/51.02, 421, 417, 14.08
See application file for complete search history.

(56) References Cited

U.S. PATENT DOCUMENTS

| | | | | |
|---|---|---|---|---|
| 2004/0141636 | A1* | 7/2004 | Liang | G06T 7/20 382/110 |
| 2011/0173143 | A1* | 7/2011 | Benjamini | G06V 40/20 706/12 |
| 2013/0284109 | A1* | 10/2013 | Conger | A01K 1/0047 119/421 |
| 2018/0004872 | A1* | 1/2018 | Kimchi | G06K 9/6282 |
| 2018/0007862 | A1 | 1/2018 | Bonin et al. | |
| 2018/0279921 | A1* | 10/2018 | Datta | A61B 5/7267 |
| 2020/0337272 | A1* | 10/2020 | Kumar | A01K 1/031 |
| 2021/0142097 | A1* | 5/2021 | Zheng | G06N 3/08 |

OTHER PUBLICATIONS

Jhuang, "Automated Home-Cage Behavioural Phenotyping of Mice", Nature Communications, vol. 10:1038, Sep. 2010, pp. 1-10.

Jukan et al., "Smart Computing and Sensing Technologies for Animal Welfare: A Systematic Review", National Science Foundation, Sep. 1, 2016, pp. 1-15.

Tungtur et al., Mouse Behavior Tracker: An Economical Method for Tracking Behaviour in Home Cages, Biotechniques, Nov. 1, 2018, vol. 63(5), pp. 215-220.

Noldus Track 3D, https://www.noldus.com/animal-behavior-research/products/track3d, Accessed Oct. 8, 2020, 4 pgs.

* cited by examiner

SYSTEMS AND METHODS OF HOMECAGE MONITORING

FIELD

The described embodiments relate to the monitoring of environment, animal physiology, and behavior in a homecage.

BACKGROUND

Due to their reduced size and similar brain architecture as primates, rodents have been widely used for studying a variety of complex behaviors. Recent development in sophisticated tools for measuring and manipulating brain activity (e.g. optogenetics, two photon imaging, widefield mesoscale imaging, fiber photometry, mini endoscopes) together with the many transgenic lines and disease models available in rodents further enhance their usefulness in studies.

Behavior monitoring systems are useful tools that allow scientists to characterize behavioral changes associated with ill health in rodents. Since mice are crepuscular and nocturnal animals (they are active at dusk and dawn and throughout the night), assessing their signs of ill health, pain and distress by animal care staff is difficult. Manual monitoring by animal care staff risks introducing observer bias in monitoring animal behavior, does not provide continuous monitoring, and lacks sensitive monitoring during dark periods when mice are most active. Further, the handling of animals in homecages may be stressful and may confound studies.

Running wheels are widely used for homecage monitoring of animal brain states (awake vs sleep) because of their low cost and ease of implementation for measuring the activity and/or changes in circadian rhythm, but their use has been shown to independently effect animal behavior and progression of disease pathology/symptoms.

RFID tags for monitoring location are disadvantageous because of poor spatial and temporal resolution and the tag itself may provide discomfort to the animal.

Existing video monitoring systems require human operators to identify animal behaviors, and do not provide automatic prediction of animal behavior in their homecage.

Monitoring the animals in their homecage has several advantages. In studying complex behavior, experimental design that requires direct animal-experimenter interaction where an animal is removed from its homecage environment and placed in an unfamiliar apparatus (novel environment) are disruptive, time- and labor-consuming and require additional laboratory space. This disruption of removing the animal from their homecage may influence its behavior, general well-being, and metabolism, affecting the phenotypic outcome even if the data collection method is automated, creating spurious findings.

SUMMARY

The present teachings are directed to systems and methods that can be integrated in many settings, for monitoring and analyzing animal behavior in a homecage environment. This automated homecage behavioral data acquisition allows investigators to study the effects of experimental manipulations and a wide range of neurological diseases by accurate measurement of progressive behavioral changes in the same animal without compromising its welfare, as well as removing experimenter bias. In addition, the systems and methods may be used for short-term welfare assessment (e.g. post-surgery monitoring) and long-term welfare assessment (e.g., monitoring of the status of animal environment such as water, food, ammonia level) by enabling continuous monitoring, even in the dark phase where welfare assessment without disturbance to the cage is difficult and subjective. Further, video data collected with this system may be used to automatically classify sleep-wake states of an animal in the home-cage.

In a first aspect, some embodiments provide a method for quantifying animal activity, comprising: receiving at least two video frames; determining at least two processed video frames from the at least two video frames by pre-processing; determining an image background from the at least two processed video frames; determining an at least two thresholded video frames by applying the background image as a threshold to the at least two video frames; determining a contour from the at least two thresholded video frames; and determining an animal motion flag if the contour is larger than a minimum area.

In a second aspect, some embodiments provide a method for quantifying animal activity, comprising: receiving at least two video frames; determining at least two processed video frames from the at least two video frames by pre-processing; determining an image background from the at least two processed video frames; determining a contour from the at least two thresholded video frames; determining the centroid of the contour; and determining an animal track from the centroid of each of the at least two thresholded video frames.

In a third aspect, some embodiments provide an animal behavior analysis system, comprising: a memory having: a first predictive model, the first predictive model for predicting a pose estimate of the animal; and a second predictive model, the second predictive model for predicting an animal state; at least one sensor, the at least one sensor for sensing the animal; a processor in communication with the memory and the at least one sensor, the processor configured to: receive a sensor input from an at least one sensor; predict the pose estimate from the sensor input and the first predictive model; and predict an animal state based on the pose estimate, the sensor input and the second predictive model.

In at least one embodiment, the predicting the pose estimate may comprise: determining a position of an at least one indicia; and predicting the pose estimate based on the position of an at least one indicia, the sensor input, and the first predictive model.

In at least one embodiment, the animal state may include at least one of a behavioral state of an animal, a social state of an animal, a position state of an animal, a sleep state of an animal, and a biological state of an animal.

In at least one embodiment, the system may further comprise: a database in communication with the memory.

In at least one embodiment, the processor may be further configured to: determine a report based on at least one of the animal state, the pose estimate, the sensor input, and the position of the at least one indicia; and store the report in the database; wherein the report, the pose estimate, and the position of the at least one indicia may correspond to a common timebase.

In at least one embodiment, the processor may be further configured to output the report.

In at least one embodiment, the processor may be further configured to output the report to a display device.

In at least one embodiment, the processor may be further configured to output the report to a server by network communication.

In at least one embodiment, the processor may be further configured to predict the pose estimate and predict the animal state generally in real-time.

In at least one embodiment, the processor may be further configured to predict the pose estimate and predict the animal state using an offline process.

In at least one embodiment, the processor may be further configured to determine, for the report, from the common timebase, a start time, an end time, and an elapsed time.

In at least one embodiment, the processor may be further configured to determine, for the report, from the position of the at least one indicia and the pose estimate, an occupancy map having a displacement of the animal.

In at least one embodiment, the processor may be further configured to determine, for the report, the speed of the animal's movement.

In at least one embodiment, the processor may be further configured to: determine a position of an object from the sensor input, and determine, for the report, from the position of the at least one indicia and the pose estimate, an interaction of the animal with the object.

In at least one embodiment, the processor may be further configured to determine at least one husbandry variable, the at least one husbandry variable in the homecage may comprise a food supply level, a water supply level, a temperature, a humidity value, ammonia level, a bedding quality metric, and a nesting quality metric, respiration, heart beat from the sensor input.

In at least one embodiment, the system may further comprise: an actuator proximate to the animal; and wherein the processor may be further configured to actuate the actuator if the report matches a pre-determined actuation condition.

In at least one embodiment, the actuator may be a haptic device.

In at least one embodiment, the at least one sensor may comprise at least one camera, at least one of a humidity sensor, at least one of a temperature sensor, and at least one of an ammonium sensor.

In at least one embodiment, the at least one camera may have an at least one infra-red camera.

In at least one embodiment, the first predictive model may be a deep neural network.

In at least one embodiment, the second predictive model may be a recurrent neural network.

In a fourth aspect, some embodiments provide a method of animal state analysis, comprising: providing, at a memory, a first predictive model, the first predictive model for predicting a pose estimate of the animal; providing, at the memory, a second predictive model, the second predictive model for predicting a state of the animal; receiving, at a processor, a sensor input from an at least one sensor; predicting, at the processor, the pose estimate from the sensor input and the first predictive model; and predicting, at the processor, an animal state based on the pose estimate, the sensor input and the second predictive model.

In at least one embodiment, the predicting a pose estimate may further comprise: determining, at the processor, a position of an at least one indicia; and predicting, at the processor, the pose estimate based on the position of an at least one indicia, the sensor input, and the first predictive model.

In at least one embodiment, the animal state may include at least one of a behavioral state of an animal, a social state of an animal, a position state of an animal, a sleep state of an animal, and a biological state of an animal.

In at least one embodiment, the method may further comprise: determining, at the processor, a report based on at least one of the animal state, the pose estimate, the sensor input, and the position of the at least one indicia, storing the report in a database, the database in communication with the memory; wherein the report, the pose estimate, and the position of the at least one indicia may correspond to a common timebase.

In at least one embodiment, the method may further comprise: outputting the report.

In at least one embodiment, the method may further comprise: outputting the report to a display device.

In at least one embodiment, the method may further comprise: outputting the report to a server by network communication.

In at least one embodiment, the predicting, at the processor, the pose estimate and predicting, at the processor, the animal state may be performed generally contemporaneously with the sensor input collection.

In at least one embodiment, the predicting, at the processor, the pose estimate and predicting the animal state may be performed generally after the sensor input collection.

In at least one embodiment, the method may further comprise: determining, at the processor, for the report, from the common timebase, a start time, an end time, and an elapsed time.

In at least one embodiment, the method may further comprise: determining, at the processor, for the report, from the position of the at least one indicia and the pose estimate, an occupancy map having a movement of the animal.

In at least one embodiment, the method may further comprise: determining, at the processor, for the report, the speed of the animal's movement.

In at least one embodiment, the method may further comprise: determining, at the processor, a position of an object from the sensor input; determining, at the processor, for the report, from the position of the at least one indicia and the pose estimate, an interaction of the animal with the object.

In at least one embodiment, the method may further comprise determining, at the processor, at least one husbandry variable, the at least one husbandry variable in the homecage may comprise a food supply level, a water supply level, a temperature, a humidity value, ammonia level, a bedding quality metric, and a nesting quality metric, respiration, heart beat from the sensor input.

In at least one embodiment, the method may further comprise: if the report matches a pre-determined actuation condition: actuating an actuator proximate to the animal.

In at least one embodiment, the actuator may be a haptic device.

In at least one embodiment, the at least one sensor may comprise at least one of an at least one camera, an at least one infra-red camera, a humidity sensor, a temperature sensor, and an ammonium sensor.

In at least one embodiment, the first predictive model may be a deep neural network.

In at least one embodiment, the second predictive model may be a recurrent neural network.

In a fifth aspect, some embodiments provide a system of generating a predictive model for predicting an animal state, comprising: a memory, the memory having: a plurality of sensor inputs; and a pose prediction model for predicting animal poses from a sensor input; a processor configured to: generate a plurality of predicted animal poses associated with the plurality of the sensor inputs, by, for each sensor input in the plurality of sensor inputs: predicting, using the first predictive model, a predicted animal pose from the sensor input; associating the predicted animal pose with the sensor input; generate a plurality of behavior labels associated with the plurality of the sensor inputs, by, for each sensor input in the plurality of sensor inputs: associating a behavior label with the sensor input; generate the second predictive model based on the plurality of sensor inputs, the plurality of predicted animal poses, and the plurality of behavior labels.

In at least one embodiment, the processor may be further configured to: display the sensor input to a user at a display device; and wherein the behavior label may be received from the user using an input device.

In a sixth aspect, some embodiments provide a method of generating a second predictive model, the second predictive model for predicting an animal state, comprising: providing, at a memory, a plurality of sensor inputs; providing, at the memory, a first predictive model for predicting animal poses from a sensor input; generating, at a processor, a plurality of predicted animal poses associated with the plurality of the sensor inputs, by, for each sensor input in the plurality of sensor inputs: predicting, using the first predictive model, a predicted animal pose from the sensor input; associating the predicted animal pose with the sensor input; generating, at the processor, a plurality of behavior labels associated with the plurality of the sensor inputs, by, for each sensor input in the plurality of sensor inputs: associating a behavior label with the sensor input; generating, at the processor, the second predictive model based on the plurality of sensor inputs, the plurality of predicted animal poses, and the plurality of behavior labels.

In at least one embodiment, the method may further comprise: displaying the sensor input to a user at a display device; and wherein the behavior label may be received from the user using an input device.

BRIEF DESCRIPTION OF THE DRAWINGS

A preferred embodiment will now be described in detail with reference to the drawings, in which.

DESCRIPTION OF EXAMPLE EMBODIMENTS

Figure 1:
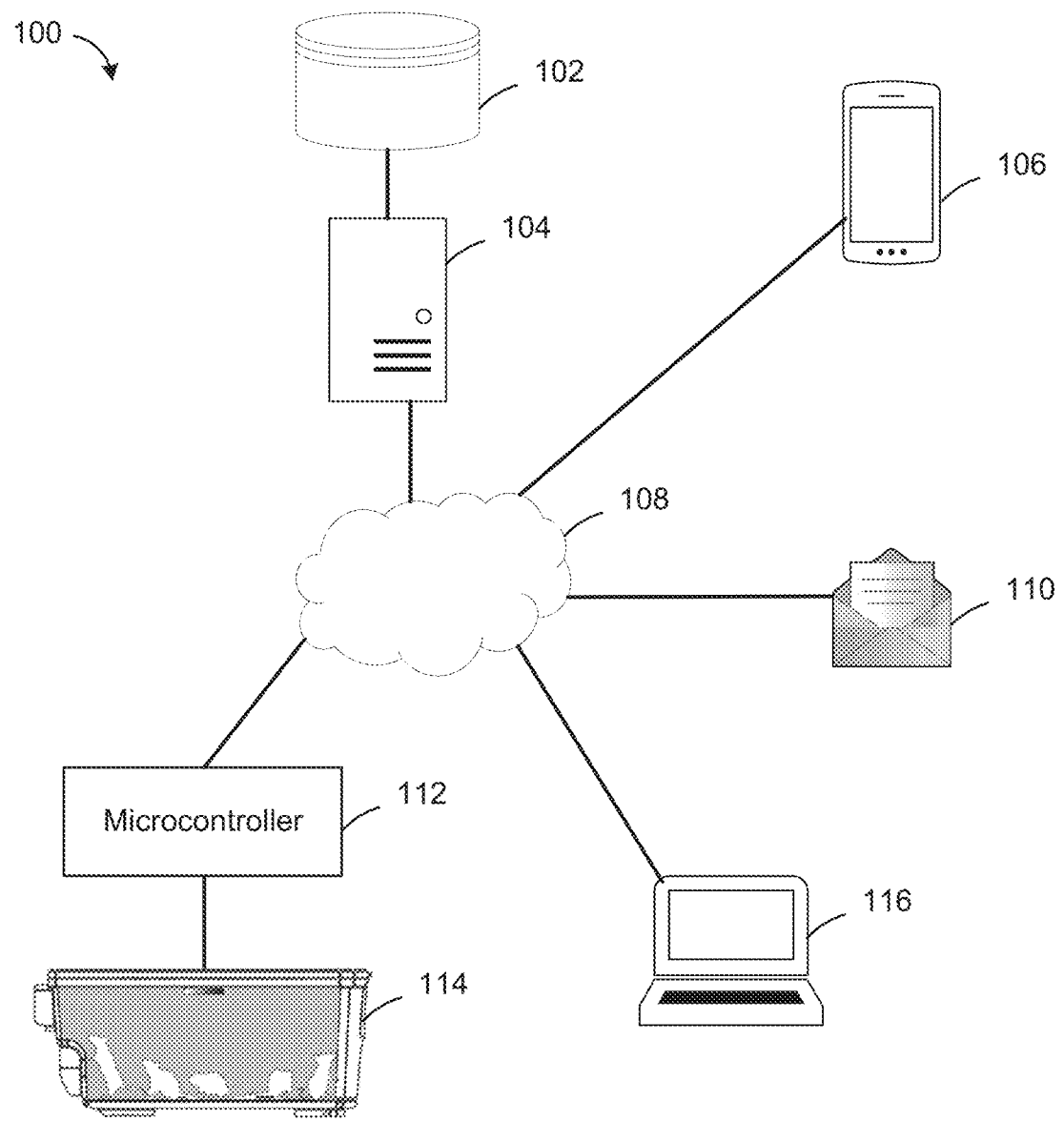
FIG. 1 is a system view of an automated homecage monitoring system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

As referred to herein, a homecage refers to any cage provided for securing an animal, such as an aquarium, a cage having bars, a box, a zoo cage, an aviary, a battery cage, a birdcage, or any other container as is known for securing an animal. The homecage may be made from any material such as clear plastic (such as polycarbonate), wire mesh, wire bars, or any other material that can be used to secure an animal from passing through it. The homecage may be opaque, transparent or translucent. The homecage may allow for air to pass into it, or may be substantially airtight. The homecage may have a separate air supply. The homecage may contain bedding, a food and water supply for the animal.

While a single homecage is shown for FIGS. 1-16, it is understood that the homecage monitoring system would apply in similar fashion to one or more homecages, where each homecage has its own microcontroller. There may be many homecages monitored in the system 100.

Reference is first made to FIG. 1, showing a system view 100 of an automated homecage monitoring system. The automated homecage monitoring system has a microcontroller 112, a server 104, a database 102, a network 108, and a homecage 114. Optionally, the system view 100 may include a mobile device 106, a computer system 116, and report 110.

The microcontroller 112 has a plurality of sensors to monitor homecage 114. The microcontroller 112 may perform additional processing, or may send collected sensor data to the server 104 for processing via network 108. When the microcontroller 112 is responsible for the additional processing, it may determine the sensor data information about the animal in the homecage 114, and provide monitoring and prediction data to the server 104 via network 108 in addition to sensor data.

Mobile device 106 and computer system 116 may be used by an end user to access an application (not shown) running on server 104 over network 108. For example, the application may be a web application, or a client/server application. The mobile device 106 and computer system 116 may each be a desktop computer, mobile device, or laptop computer. The mobile device 106 and computer system 116 may be in communication with server 104, and microcontroller 112. The mobile device 106 and computer system 116 may display the web application, and may allow a user to see monitoring data from the homecage, or more than one homecages that are monitored. An administrator user may use the mobile device 106 or the computer system 116 to access the server 104 and configure the homecage monitoring system. The user at mobile device 106 or computer system 116 may review monitoring data and apply pose estimate labels or state labels to sensor data from the homecage to "train" the automated homecage monitoring system. The server 104 receives the pose estimate labels or state labels and stores them in database 102.

The server 104 may be a commercial off-the-shelf server, or another server system as are known. The server 104 may run a web application on a web server or application server (not shown) accessible via network 108. The web application may be used by a user to manage, view, and perform various user input and output tasks on a homecage monitoring system associated with a plurality of homecages.

The server 104 may generate and send an automated homecage monitoring report 110 via network 108. The report 110 may be sent via email, SMS, application-based notification, etc. The users using mobile device 106 or computer system 116 may respond to the report 110 to review the monitoring data for a homecage 114 or a group of homecages. The report 110 may be an alert sent to the users at mobile device 106 or computer system 116 to warn them that intervention is required in one or more homecages 114 in a group of homecages.

The server 104 may also provide a database including historical sensor data from the homecage 114, historical event data from the homecage 114 (including animal husbandry data), one or more predictive models for estimating animal poses, and one or more predictive models for predicting animal or homecage states. The server 104 may further predict animal or homecage states in order to provide an alarm for an operator to address the animal or homecage state, such as to change the homecage bedding, add water, or add food in a predicted period of time.

The server 104 may also store the sensor data from one or more microcontrollers associated with one or more homecages 114.

Network 108 may be a communication network such as the Internet, a Wide-Area Network (WAN), a Local-Area Network (LAN), or another type of network. Network 108 may include a point-to-point connection, or another communications connection between two nodes.

Database 102 may be a relational database, such as MySQL or Postgres. The database 102 may also be a NoSQL database such as MongoDB. The database may store the reports and sensor data from the microcontroller 112 of each homecage 114.

Report 110 may be an HTML formatted, text formatted, or a file-based report that is provided by email, SMS, or application-based notification to a user. The report 110 may include a URL link to the web application on server 104.

The microcontroller 112 may be an embedded system such as Arduino®, field-programmable gate array (FPGA), or a small form-factor computer system such as a Raspberry Pi®. The microcontroller 112 may have or be connected to at least one sensor (not shown) for sensing the animal in the homecage 114, or environmental conditions in the homecage 114.

Figure 2:
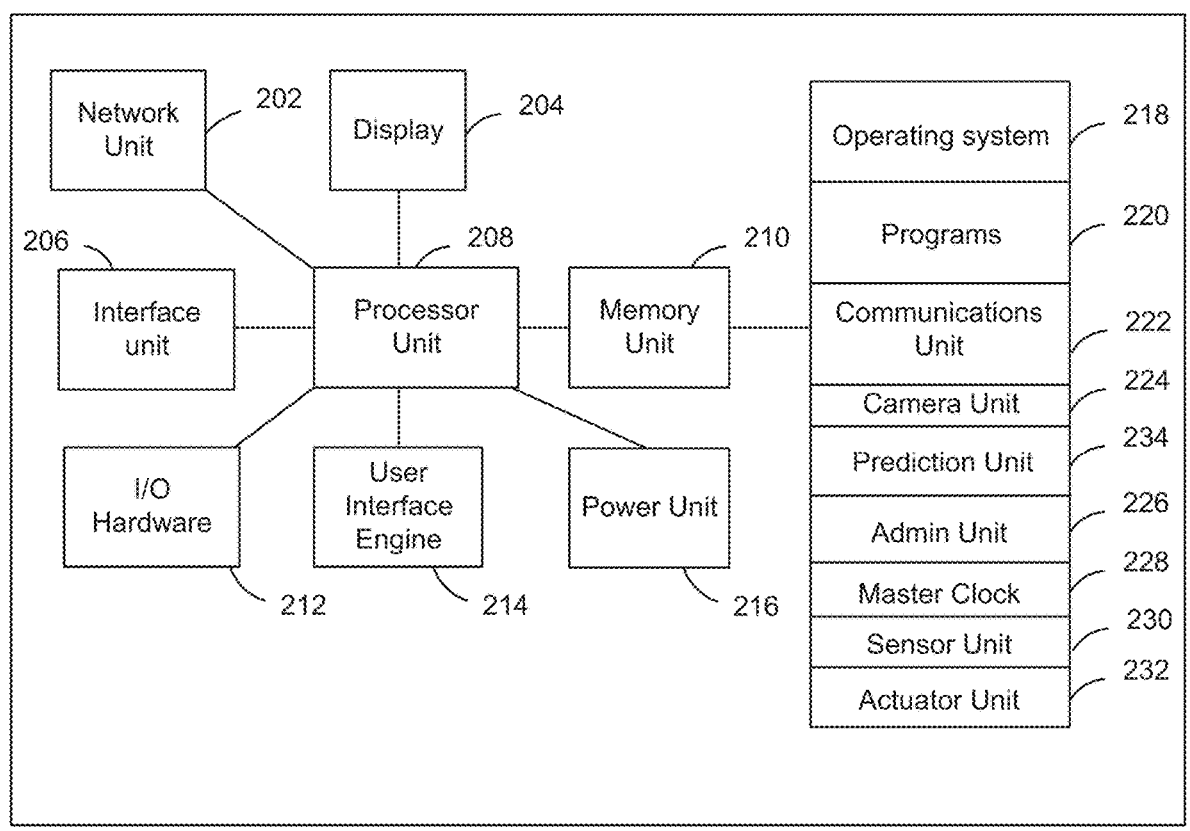
FIG. 2 is a block diagram of the microcontroller 112 in FIG. 1.
Figure 3:
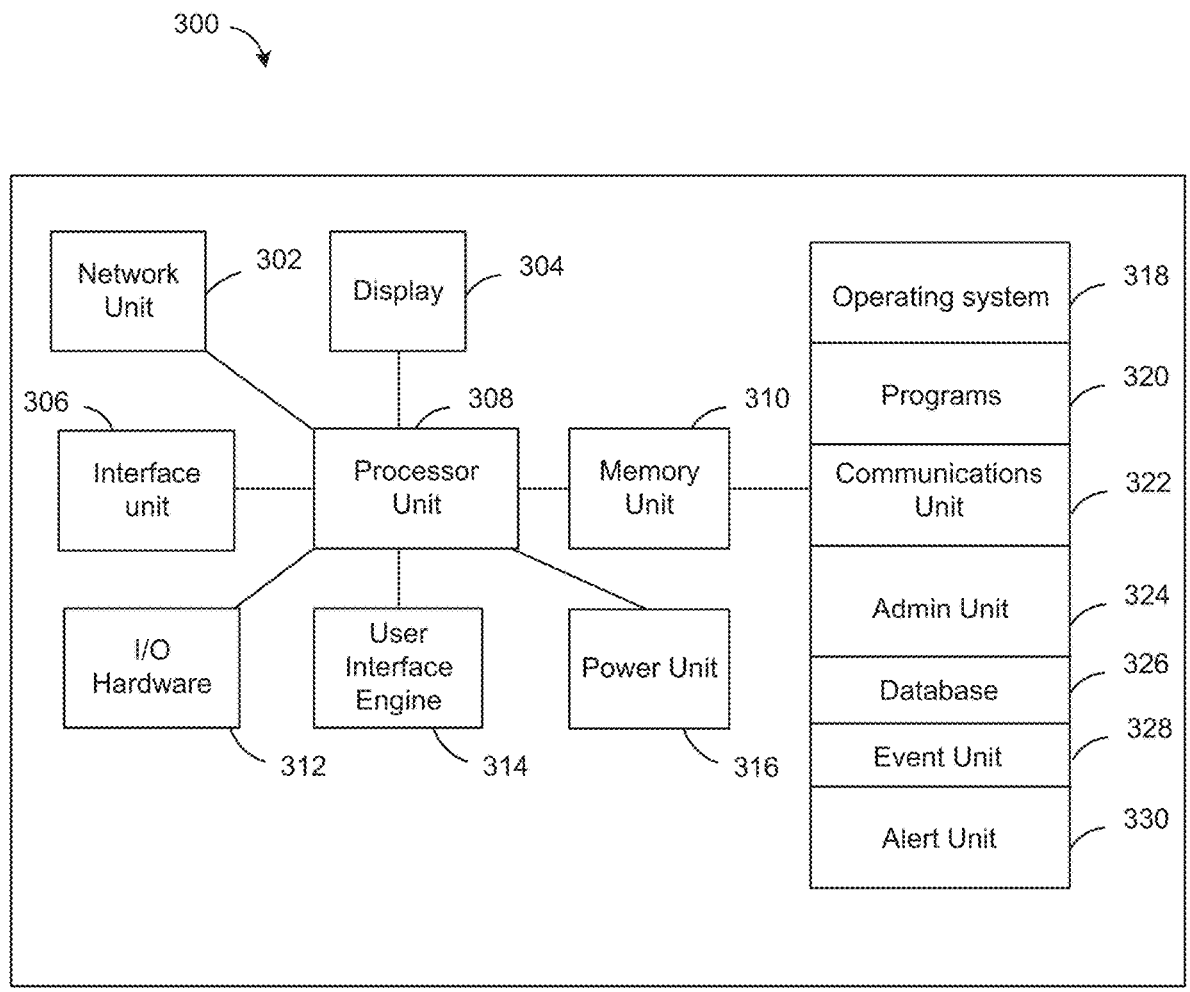
FIG. 3 is a block diagram of the server 104 in FIG. 1.

For FIGS. 2-3, like numerals refer to like elements between the figures, such as the network unit 202, display 204, interface unit 206, processor unit 208, memory unit 210, I/O hardware 212, user interface 214, power unit 216, and operating system 218.

Referring to FIG. 2, a block diagram 200 is shown of the microcontroller 112 from FIG. 1. The microcontroller 112 has a network unit 202, a display 204, an interface unit 206, a processor unit 208, a memory unit 210, i/o hardware 212, a user interface engine 214, and a power unit 216.

The network unit 202 may be a standard network adapter such as an Ethernet or 802.11x adapter. The processor unit 208 may include a standard processor, such as the Intel® Xeon® processor or an Advanced RISC Machine (ARM) processor, for example. Alternatively, there may be a plurality of processors that are used by the processor unit 208 and may function in parallel.

The processor unit 208 can also execute a graphical user interface (GUI) engine 214 that is used to generate various GUIs. The user interface engine 214 provides for administration of the homecage monitoring, and the information may be processed by the admin unit 226. User interface 214 may implement an Application Programming Interface (API) or a Web-based application that is accessible via the network unit 202. The API may provide connectivity with the server by either push or pull requests, i.e. the microcontroller 112 may send data to the server as it is collected, or the server may contact the microcontroller via network unit 202 to pull data.

Memory unit 210 may have an operating system 218, programs 220, a communications unit 222, a camera unit 224, a prediction unit 234, an admin unit 226, a master clock 228, a sensor unit 230, and an actuator unit 232. Some features and functions provided by memory unit 210 may be performed entirely at the microcontroller, entirely at the server, or a combination of both the microcontroller and the server. In the case where features and functions are performed at the server, the server may operate on sensor data sent from the microcontroller to the server.

The operating system 218 may be a Microsoft Windows Server® operating system, or a Linux®-based operating system, or another operating system. In the case that the microcontroller is an embedded system of an FPGA, it may run an embedded operating system, or no operating system at all.

The programs 220 comprise program code that, when executed, configures the processor unit 208 to operate in a particular manner to implement various functions and tools for the microcontroller 200.

Communications unit 222 provides functionality for sending and receiving sensor data and predictive models using network unit 202, as well as provided access for users to the admin unit 226 using network unit 202.

Camera unit 224 receives data from the sensor unit 230, and may operate to provide image manipulation for collected sensor data. The camera unit 224 may function to create image files for sending to the server via communications unit 222. The camera unit may also provide image manipulation as disclosed herein to determine monitoring data from image data collected by sensors in the homecage. Such monitoring data may include the position of an animal in the homecage, the path the animal has taken in the homecage, the position of an object in the homecage, the food or water levels inside the homecage, or other visual based monitoring data.

The prediction unit 234 operates to provide predictions based on the sensor data from sensor unit 230 and at least two predictive models. The prediction unit 234 may determine a predictive model from historical sensor data and labels from the database, or historical sensor data and labels on the microcontroller 200. The prediction unit 234 may have a first predictive model that can predict a pose estimate based on sensor data. The prediction unit 234 may have a second predictive model that can predict an animal state based on the pose prediction and sensor data. The prediction unit 234 may associate the predicted pose estimate and animal state with a report, and may send the report to the server. The report sent by the microcontroller 200 to the server may include sensor data and predictions from the prediction unit 234 that are associated with a particular start and end time, and have a corresponding common timebase from master clock 228. The report sent by the microcontroller 200 to the server may include quantitative measures of the event, including start time, end time, elapsed time, frequency, etc. The prediction unit 234 may predict a pose estimate based on a position of an at least one animal feature in the sensor data. The animal state prediction by prediction unit 234 may include a behavioral state of an animal, a social state of an animal, a position state of an animal, a sleep state of an animal, and a biological state of an animal.

The prediction unit 234 may provide an estimation of the remaining food and water supply levels or the current state of the bedding (e.g. clean, dirty, flood, etc.) and nesting in a homecage 114, and may provide an occupancy map of the homecage 114 showing an animal's movement path. The prediction unit 234 may further detect animal birth in a homecage, and may trigger an alarm for an operator to attend. The food and water supply levels, the status of the bedding and nesting and the occupancy map may be included in the report. The bedding and nesting status may be represented as quality metrics, and may be represented on a scale of 0 to 100, a letter grade, etc. Specific quality metrics may be tracked related to the cleanliness of the bedding, or if a flood of the water supply into the homecage has occurred. The estimation of the current state of the homecage may be include at least one husbandry variable, the at least one husbandry variable in the homecage comprising a food supply level, a water supply level, a temperature, a humidity value, a bedding quality metric, and a nesting quality metric from the sensor input.

Admin unit 226 may provide user access to the microcontroller 200. This may allow an administrator user to configure the monitoring parameters for a homecage 114. Separately, a user may access the admin unit 226 to review monitoring data, view a real-time video feed of the homecage, review historical events, review video data associated with a historical event, etc.

Master clock 228 is an internal clock for microcontroller 200 for associating a common timebase with data collected by sensor unit 230. This common timebase may ensure that the collected data can be referenced based on time, and each different type of sensor data collected can be precisely identified based on the time it is collected. The master clock 228 may be synchronized with a master clock on the server so that both the server and the microcontroller use a generally synchronized clock to record and process monitoring data. The server and the microcontroller may use a networking protocol for clock synchronization such as the Network Time Protocol (NTP).

The sensor unit 230 provides an interface to one or more sensors connected to microcontroller 200 using i/o hardware 212. Optionally, the sensor unit 230 may receive sensor data from another source via a network connection using network unit 202. The sensor unit 230 may pre-process sensor data, for example, it may add a video filter to a video sensor signal, or it may normalize an audio signal. In the case of image data pre-processed by sensor unit 230, filters may be applied such as a Gaussian blur, averaging, color-grayscale conversions, and the like. The sensor unit 230 may operate to send sensor data to a server via communications unit 222 and network unit 202. The sensor unit 230 may operate to determine the measurement frequency, and bandwidth of sensors connected to the microcontroller 200. The sensor unit 230 may be modular, and may allow for more than one sensor to be connected to the microcontroller 200, and may allow for data to be collected from multiple sensors simultaneously. Sensor unit 230 may be compatible with multiple different types of sensors such as at least one camera including at least one an infra-red camera (including both passive and active), humidity sensors, temperature sensors, microphone sensors, light sensors, pressure sensors, accelerometer sensors, proximity sensors, ultrasonic sensors, vibration sensors, electrical current and electrical potential sensors, fluid flow sensors, laser position sensors, laser proximity sensors, and ammonium sensors.

The sensor unit 230 may log events based on the sensor data, including string pulling, animal movement paths, animal speed, novel object recognition, social interaction, light-dark box, activity in the homecage 114, etc.

Actuator unit 232 provides control of at least one actuator proximate to, or inside the homecage 114. The actuators may include linear actuators, pneumatic actuators, buzzers, speakers, thermal actuators, piezoelectric actuators, servo-mechanisms, solenoids, stepper motors, or the like.

The prediction unit 234 may be configured to operate the actuator unit 232 based on a prediction of pose estimate or animal state. The admin unit 226 may also allow a user to operate an actuator remotely. The actuators may also be actuated based on sensor data collected by sensor unit 230. For example, a researcher user may configure the microcontroller 112 to wake an animal up with an actuator after a predetermined amount of sleep, and the microcontroller 112 may do so based on a predicted sleep state of an animal.

Referring next to FIG. 3, there is shown a block diagram 300 of the server 104 from FIG. 1. The server 104 has a network unit 302, a display 304, an interface unit 306, a processor unit 308, a memory unit 310, i/o hardware 312, a user interface engine 314, and a power unit 316.

The server may perform many of the functions of the microcontroller 112 (see FIG. 1), including the features of the camera unit 224, prediction unit 234, admin unit 226, and master clock 228 (see FIG. 2). In the case where a feature of the microcontroller is performed by the server 300, then the microcontroller may function as a "dumb" device where it accepts configuration parameters, sends collected sensor data to the server using the communications unit 222, and activates the at least one actuator of the actuator unit 232 in response to an instruction sent to the microcontroller via communications unit 222 (see FIG. 2).

The user interface engine 314 may be provided to generate various user interfaces that may be delivered using a web server in programs 320 to deliver the user interfaces via the network unit 302 to users of the automated homecage monitoring system. These user interfaces may display information for users of the homecage monitoring system, and may accept user input from the users in order to control the homecage monitoring system. The user interfaces produced by user interface engine 314 may include those found in FIGS. 15-34.

The operating system 318 may be a Microsoft Windows Server® operating system, or a Linux®-based operating system, or another operating system. The operating system 318 may also be a mobile operating system such as Google® Android® or Apple® iOS.

The programs 320 comprise program code that, when executed, configures the processor unit 308 to operate in a particular manner to implement various functions and tools for the server 300.

Communications unit 322 provides functionality for sending and receiving sensor data and predictive models using network unit 302, as well as provide access for users to the admin unit 326 using network unit 302.

Admin unit 324 may be an application available to users via the communications unit 322. The server admin unit 324 may allow users to view monitoring data, predictions, and configuration information for at least one of the homecage monitoring system in FIG. 2. Users may use the admin unit 324 to manage the configuration of at least one homecage monitoring system. The admin unit 324 may also allow for the configuration of reports from homecage monitoring systems, and event alerts from the homecage monitoring systems (see e.g. 110 in FIG. 1).

The server 300 may store monitoring data from the at least one homecage monitoring system, event data, report data, alert data, and sensor data in database 326. The database 326 may also store predictive models for homecage or entire colony variables, pose estimate and animal state. In an alternate embodiment, a separate database (not shown) may be used to store predictive models for the entire colony variables. The database 326 may be responsive to queries from the homecage monitoring system microcontrollers, and may send stored data to the microcontroller using communications unit 322 and network unit 302.

The event unit 328 provides functionality for combining sensor data, monitoring data, quantitative data, and prediction data into an report that can be stored in database 326. Responsive to user configuration, the event unit 328 can also send reports to users via email or SMS. The reports generated by event unit 328 may be sent at regular intervals, or may be sent on-demand. The reports may be HTML formatted, or text formatted. The reports generated by event unit 328 may include a URL link to a web application running on the server 300.

The alert unit 330 may send alerts to users via SMS or email responsive to configurable events happening at a homecage system. For example, an alert may be sent if food or water or bedding state for a particular homecage is below a specified threshold. The alert unit 330 may send alerts based on predicted poses or predicted animal states. The alerts may have different severity levels, for example, there may be an "info" level, an "warning" level, an "error" level, or a "severe" level.

Figure 4:
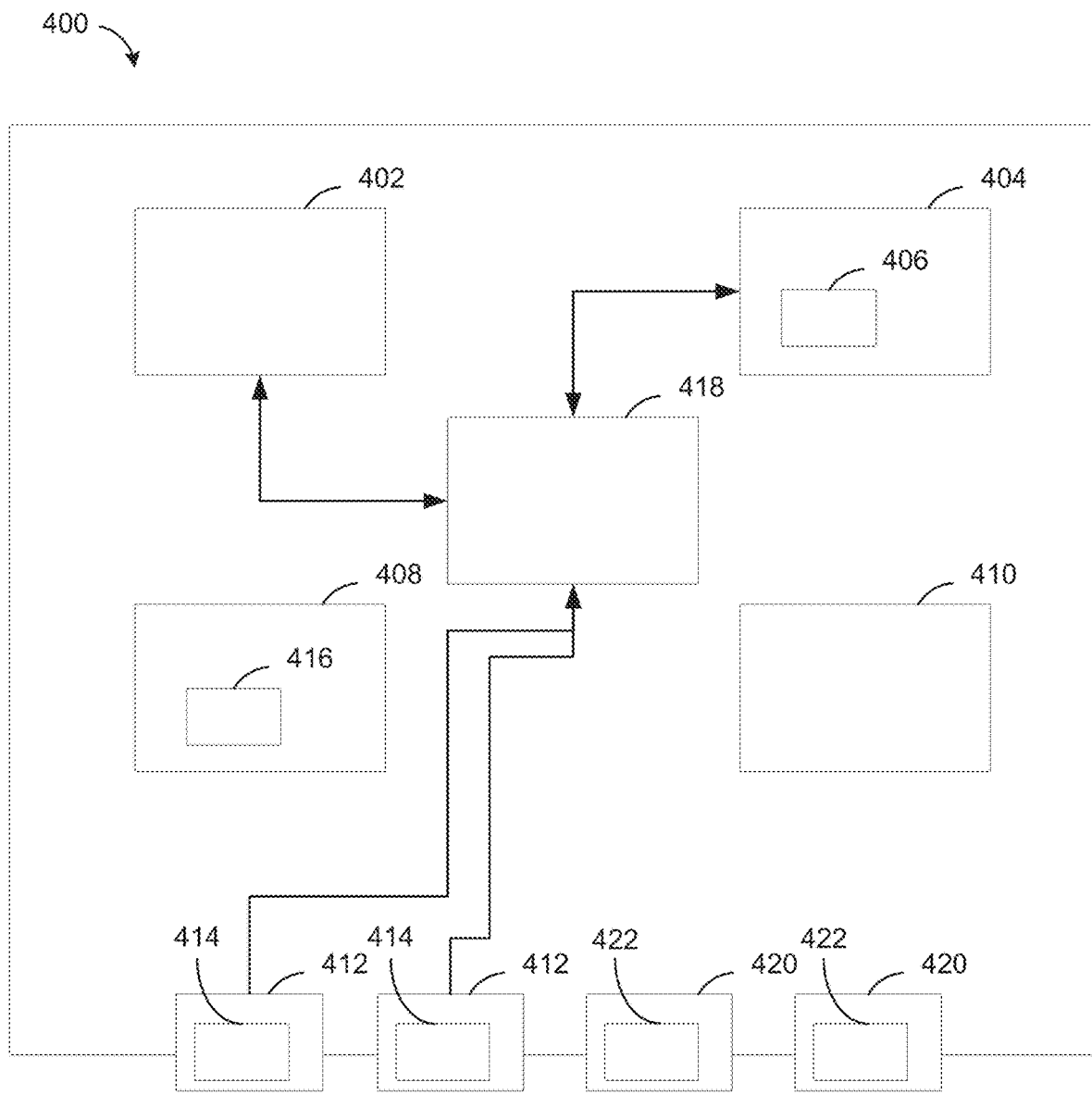
FIG. 4 is a software component diagram of an automated homecage monitoring system.

Referring now to FIG. 4, there is a software component diagram of an automated homecage monitoring system 400. The homecage monitoring system 400 has a communications module 402, a camera module 404 having a camera or image analysis module 406, a master clock 408 having a plurality of timestamps 416 on a common timebase, a prediction module 418, an administrator module 410, at least one sensor module 412 having a sensor analysis module 414, at least one actuator module 420 having an actuator analysis module 422.

The communications module 402 sends reports and alerts. The reports and alerts may be sent to a user via email, SMS or Twitter, may be sent to the server, or may be sent to both the user and the server.

The camera module 404 acquires video using an attached camera sensor. The camera module 404 has an analysis sub-module that performs image processing on the video, including for example Gaussian blurring. Depending on requirements, the camera or image analysis submodule 406 may be performed at the microcontroller, at the server, or at both the microcontroller and the server. The image analysis submodule may have a modular design of the system allowing the user to modify the video analysis algorithm.

Each frame of video from the camera module 404 may be timestamped with the time of collection from the master clock 408 using timestamps 416. These timestamps are used in order to synchronize video with other systems such as, for example, electrophysiology, pupil camera, or other sensor data. The master clock module 408 synchronizes the modules by generating timestamps on a common timebase, and associating the timestamps 416 with sensor data collected via the sensor modules 412, actions taken by actuator modules 420, predictions by prediction module 418, and other monitoring data.

Prediction module 418 may receive a first predictive model and a second predictive model from the server using communications module 402. The first predictive model and the second predictive model may be used to determine, for collected sensor data (including video data from the camera sensor), a predicted pose and a predicted animal state.

Administrator module 410 may produce reports based on sensor data, prediction data, and other monitoring data. The reports may be sent by administrator module to the server, to the user, or to both the server and the user.

At least one sensor module 412 having a sensor analysis submodule 414 acquires sensor data from at least one sensor. The sensors may be inside the homecage environment or may be proximate to the homecage. The sensor analysis submodule may detect events based on sensor input. The sensor analysis submodule 414 may pre-process collected sensor data, such as by averaging sensor data or filtering sensor data.

At least one actuator module 420 having an actuator analysis module 422 activates an actuator in a homecage or proximate to a homecage in response to an event, a prediction, or user input.

Figure 5:
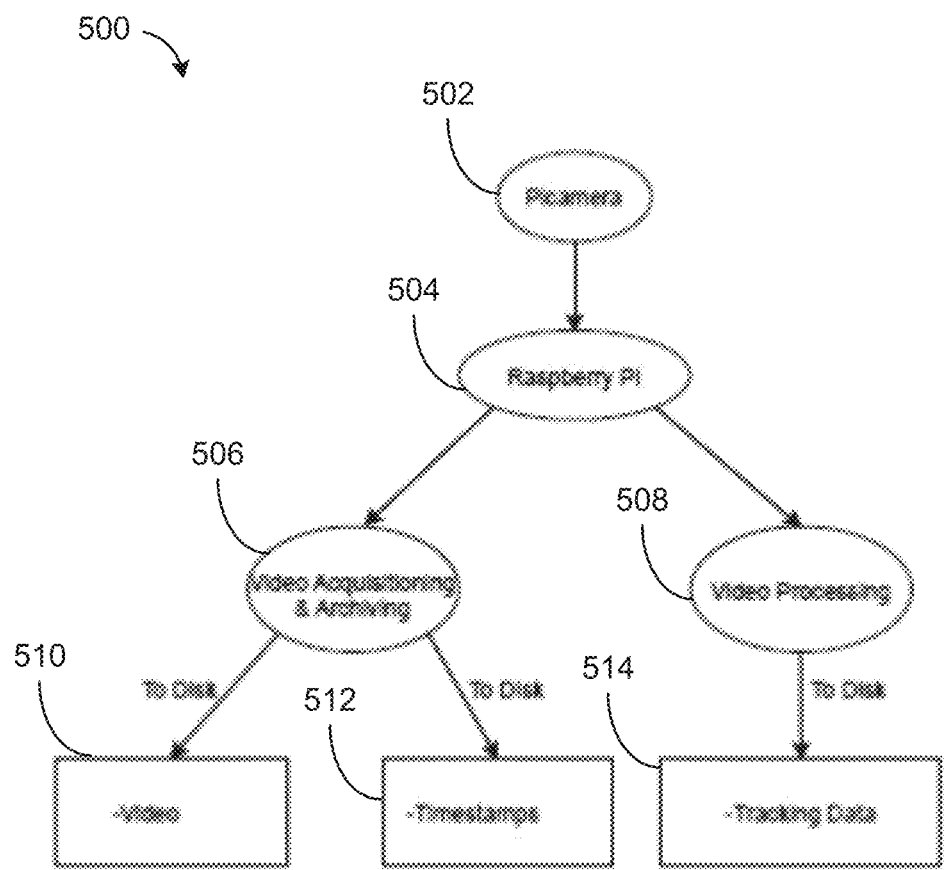
FIG. 5 is a relationship diagram of an automated homecage monitoring system.

Referring to FIG. 5, there is a relationship diagram 500 of the video data collection of the automated homecage monitoring system. The automated homecage monitoring system may have at least one camera 502 connected to the microcontroller 504. The microcontroller 504 may operate in a "dumb" or a "smart" mode.

When operating in a "dumb" mode, the microcontroller 504 collects video and archives it with the server, where the server is responsible for the video processing 508.

When operating in a "smart" mode, the microcontroller 504 operates to perform simultaneous video acquisition and archiving 506 and video processing 508.

Video acquisition and archiving 506 may include writing video frames 510 including timestamps 512 to a storage device at the microcontroller 504. The acquisition and archiving 506 may also include sending the video data 510 (including timestamps 512) to the server. The video acquisition and archiving 506 may process more than one camera at a time. For example (see FIGS. 6C and 6D) multiple camera sensors can be used for simultaneous acquisition of animal state from multiple directions.

Generally simultaneously, the video processing 508 may determine tracking data 514 and write it to a storage device on the microcontroller 504. The tracking data 514 may include an animal's path in the homecage. The tracking data 514 may also include event data and prediction data determined at the microcontroller. The tracking data 514 may also be sent to the server.

Figure 6A:
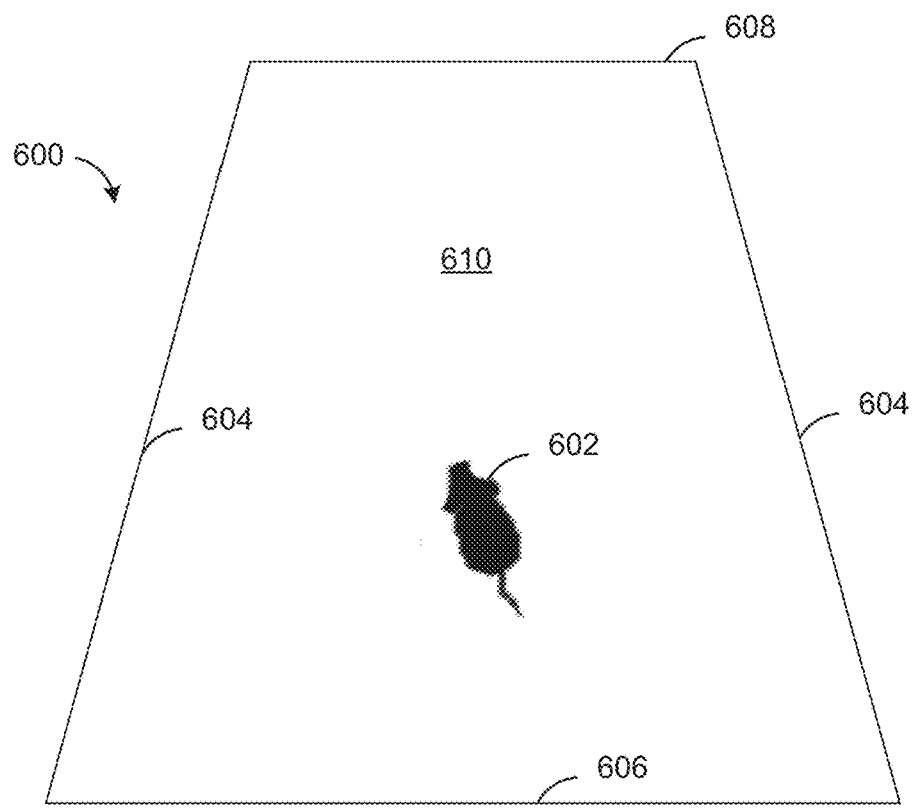
FIG. 6A is a cutaway top view of a homecage.

Referring to FIG. 6A, there is a cutaway top view of a homecage 600. The homecage 600 has a base 610. Two sidewalls 604, a front wall 606 and a back wall 608 extend from the base 610 to form an enclosure for animal 602. The enclosure may include ventilation holes in the front wall, the back wall, or the sidewalls. Alternatively the homecage may have a self-contained ventilation system. The homecage 600 may be a variety of sizes relative to the animal, generally offering enough space for the animal to move around. The base 610, sidewalls 604, front wall 606 and back wall 608 may be made from a variety of materials, including wood, plastic, or metal. The base 610, sidewalls 604, front wall 606 and back wall 608 may have various constructions including a solid piece of material, a mesh, spaced apart bars.

Figure 6B:
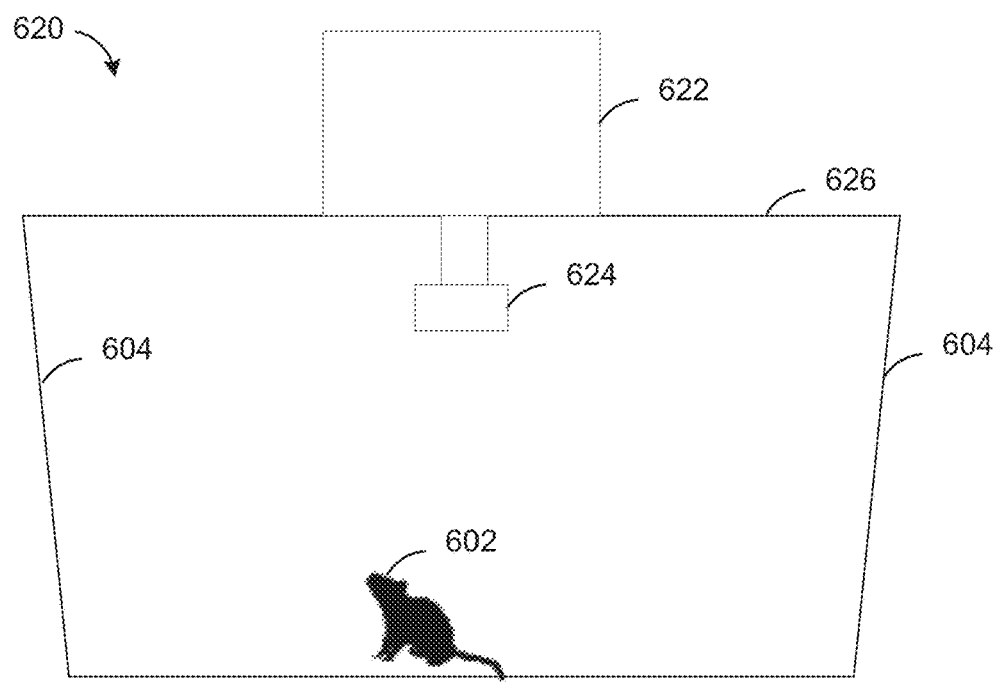
FIG. 6B is a front view of the homecage in FIG. 6A.

Referring to FIG. 6B, there is a front view 620 of the homecage in FIG. 6A. The homecage 620 has a top 626, with a microcontroller 622 disposed on it. The microcontroller 622 may be connected to an at least one sensor 624 through the top 626. The at least one sensor 624 may be inside the homecage as shown, or instead may be positioned outside and proximate to the homecage. The at least one sensor 624 may include at least one camera, at least one infra-red camera (including both passive and active), humidity sensors, temperature sensors, microphone sensors, light sensors, pressure sensors, accelerometer sensors, proximity sensors, ultrasonic sensors, vibration sensors, ammonia sensor, radar system for detection of respiration and heartbeat, electrical current and electrical potential sensors, fluid flow sensors, and ammonium sensors.

Figure 6C:
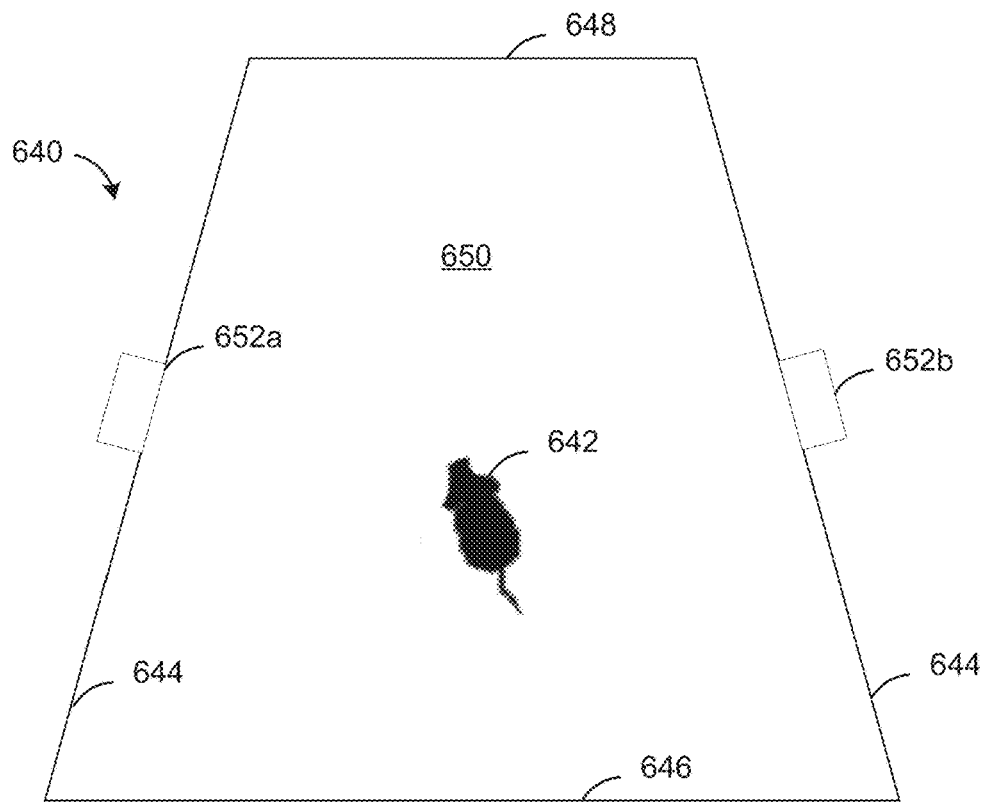
FIG. 6C is a cutaway top view of another homecage.

Referring to FIG. 6C, there is a cutaway front view 640 of another homecage. The homecage 600 has a base 650. Two sidewalls 644, a front wall 646 and a back wall 648 extend from the base 650 to form an enclosure for animal 642. The enclosure may include ventilation holes in the front wall, the back wall, or the sidewalls. Each sidewall 644 has a sensor 652 connected to it. The sensors 652 may communicate wirelessly with microcontroller 662, or they may be wired. The sensors may be a variety of different types, including at least one camera, at least one infra-red camera (including both passive and active), humidity sensors, temperature sensors, microphone sensors, light sensors, pressure sensors, accelerometer sensors, proximity sensors, ultrasonic sensors, vibration sensors, electrical current and electrical potential sensors, fluid flow sensors, and ammonium sensors. There may be multiple sensors disposed together at 652.

Figure 6D:
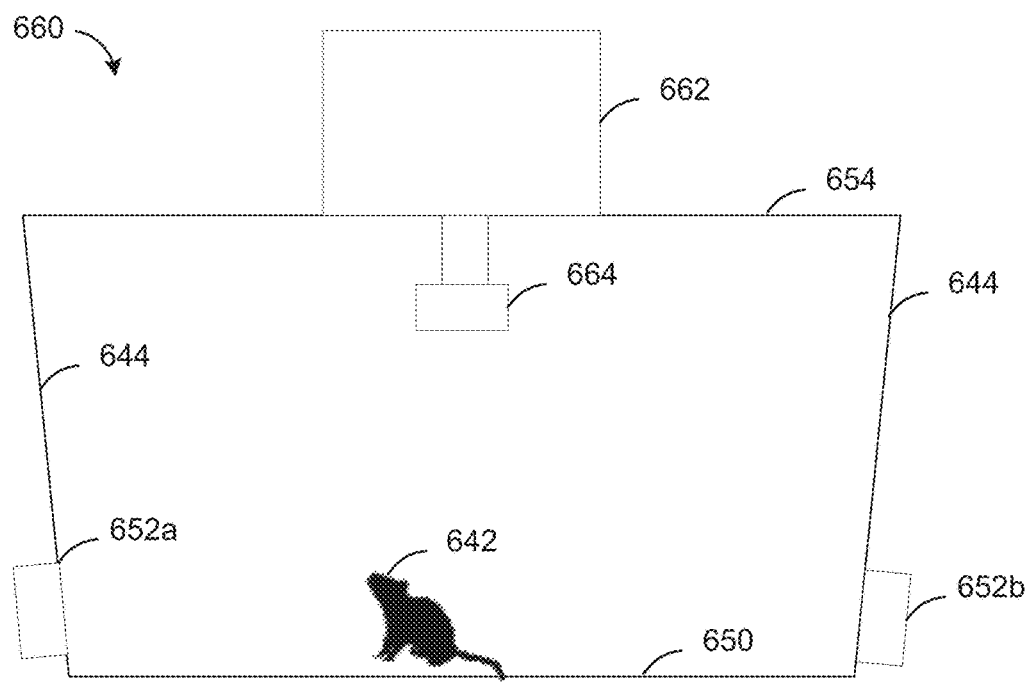
FIG. 6D is a front view of the homecage in FIG. 6C.

Referring to FIG. 6D, there is a front view 660 of the homecage from FIG. 6C. The homecage 660 has a microcontroller 662 disposed on top 654, at least one sensor disposed on sidewall 652, and at least one sensor connected to microcontroller 654 through top 654. The sensors 652, 654 may function individually or in combination to generate sensor data about animal 642 or the homecage 660 environment.

Figure 7:
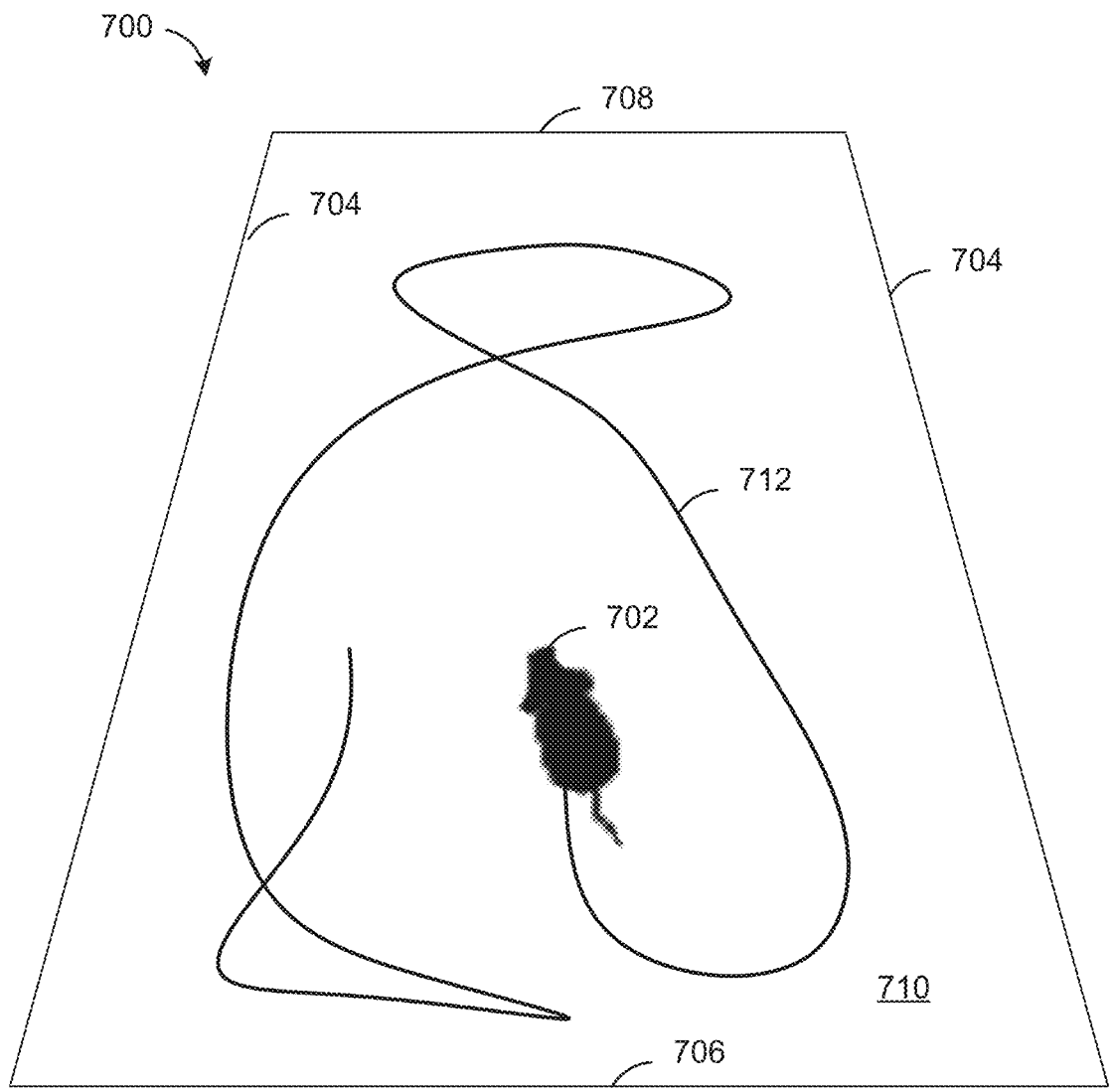
FIG. 7 is a cutaway top view of another homecage.

Referring to FIG. 7, there is a cutaway top view 700 of another homecage. The animal 702 may move about the homecage on floor 710 in the region bounded by sidewalls 704, front wall 706, and back wall 708. The homecage monitoring system may track the path taken by the animal 702, including a track plot 712 around the homecage 700.

Figure 8:
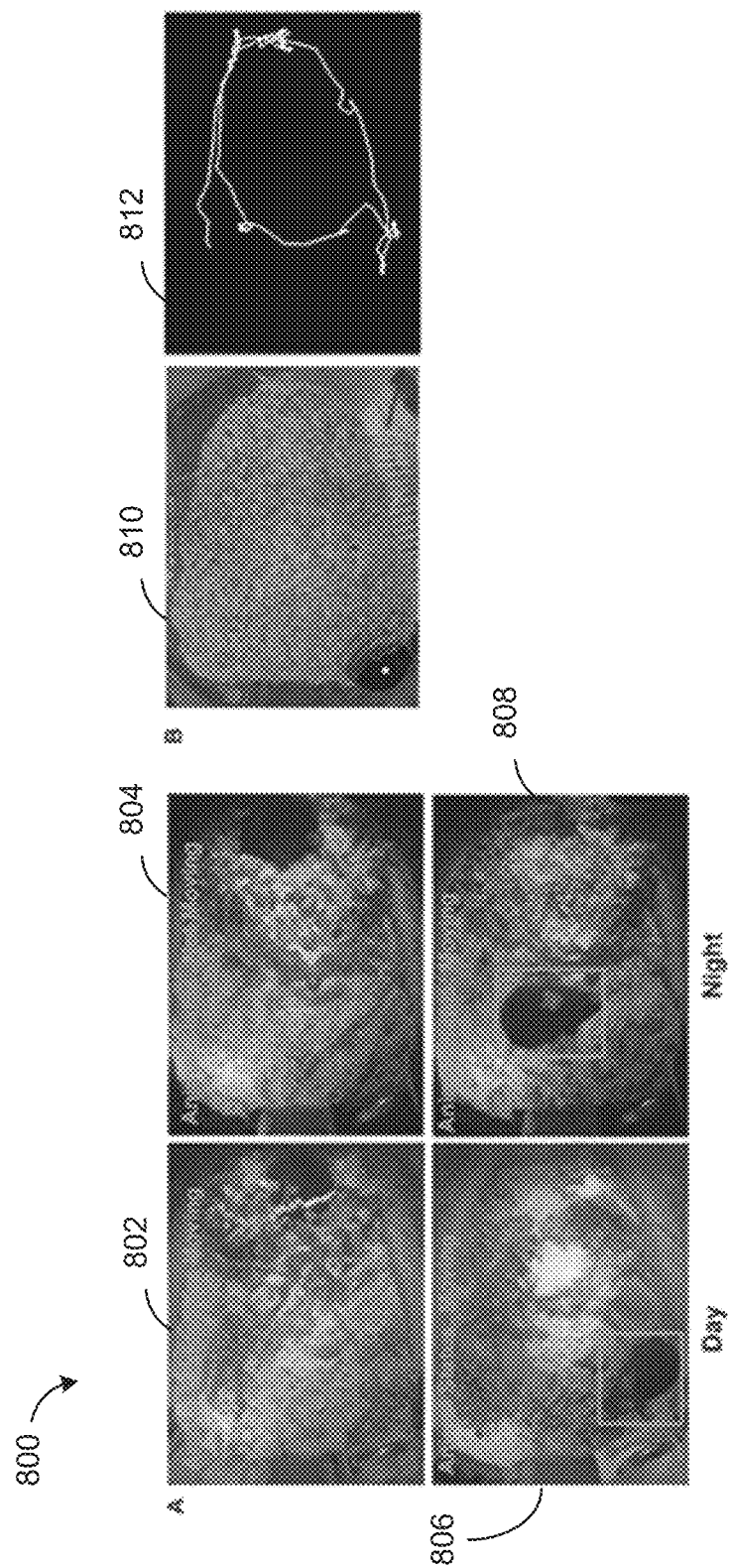
FIG. 8 is a sensor data diagram of an automated homecage monitoring system.

Referring to FIG. 8, there is a sensor data diagram 800 of an automated homecage monitoring system. The sensor data diagrams 802, 804, 806, 808 show the result of animal motion flag in FIG. 9A. The sensor data is shown for moving 806 and non-moving 802 animals during the day, as well as moving 808 and non-moving 804 during the night. Sensor data 810 shows the location of the centroid determined using the method in FIG. 9B. Sensor data 812 shows the track plot generated from the centroid determined in FIG. 9B.

Figure 9A:
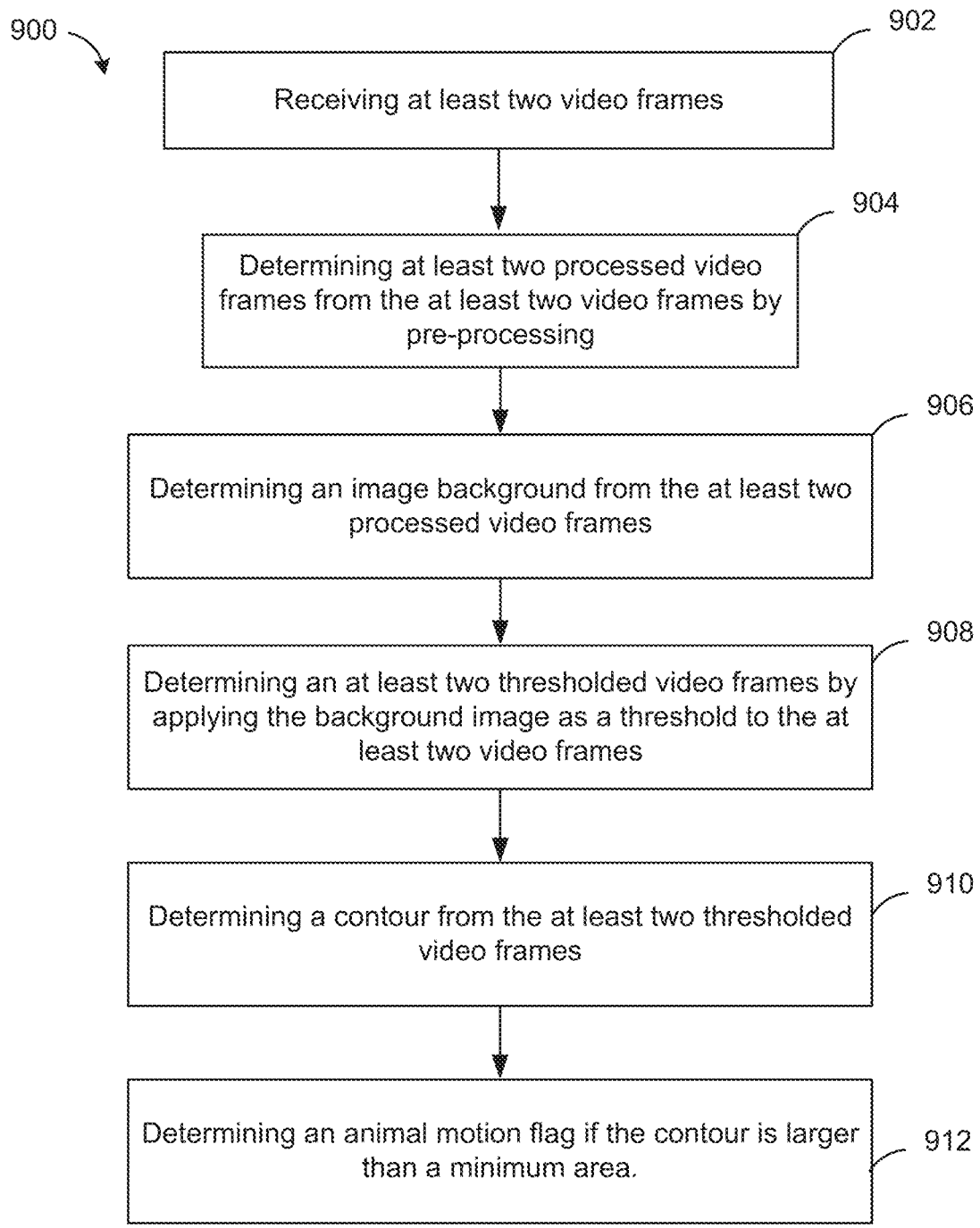
FIG. 9A is a method diagram for automated homecage monitoring.

Referring to FIG. 9A, there is a method diagram 900 for automated homecage motion detection. The method 900 is operated by the microcontroller or the server based on video data from an at least one sensor. The method 900 is operable to find animals motion flag that identifies a Boolean value associated with whether animal or animals in the homecage has or have moved.

In one or more embodiments, the method 900 may be operable to find two or more animals and determine a Boolean value associated with each of the two or more animals. The Boolean value is associated with a determination of whether each animal has moved.

In one or more embodiments, instead of a Boolean value, the method 900 may determine a health score of the one or more animals in the homecage. The health score may be a range of values corresponding to the activity level of the one or more animals in the homecage, and may further estimate the "health" of the animals.

At 902, at least two video frames are received. The at least two video frames may be indexed to the same timebase, and each frame may have an associated timestamp. The video may be received in a variety of formats, for example, the Raspberry Pi® camera board v2.1 has an 8 MP Sony® IMX219 sensor that collects video data at 30 fps using a h264 encoding at 600×800 pix resolution. (other formats: YUV, JPEG)

At 904, at least two processed video frames are determined from the at least two video frames by pre-processing. The processing may include applying a Gaussian filter to each video frame to reduce noise, resizing the video frame, and conversion to a grayscale colour profile.

At 906, an image background may be determined from the at least two processed video frames. The processing may involve calculating a weighted running average of the at least two frames. The image background may be determined from the at least two processed video frames using frame differencing, as known.

At 908, an at least two thresholded video frames are determined by subtracting the background image from each of the processed video frames to determine motion areas which contain values above a certain threshold.

At 910, a contour is determined from each thresholded video frame. The contour operation provides a contour-detected area which, in the homecage, is generally an area representing the animal's position.

At 912, an animal motion flag is determined if the contour is larger than a minimum area. The minimum area may be a configurable threshold.

Figure 9B:
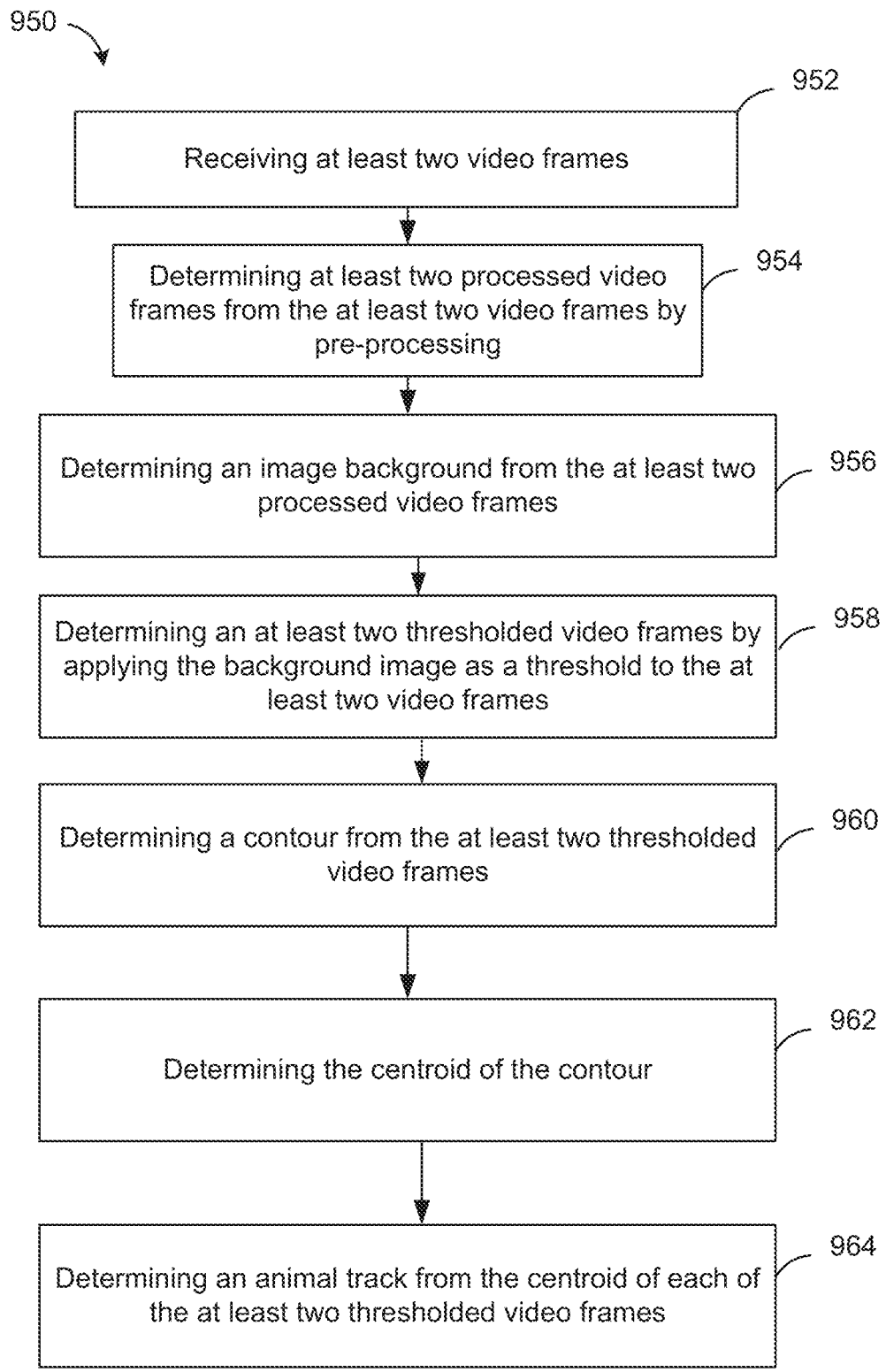
FIG. 9B is a method diagram for automated homecage monitoring.

Referring to FIG. 9B, there is a method diagram 950 for automated homecage monitoring. The method 950 is operated by the microcontroller or the server based on video data from an at least one sensor. The method 950 may operate to determine a tracking path of an animal or animals in a homecage.

At 952, at least two video frames are received. The at least two video frames may be indexed to the same timebase, and each frame may have an associated timestamp. The video may be received in a variety of formats, for example, the Raspberry Pi® camera board v2.1 has an 8 MP Sony® IMX219 sensor that collects video data at 30 fps using a h264 encoding.

At 954, at least two processed video frames are determined from the at least two video frames by pre-processing. The pre-processing may include resizing the video frame, conversion to grayscale colour profile, and the application of a Gaussian blur.

At 956, an image background is determined from the at least two processed video frames. The processing may involve calculating a running average of the at least two frames.

At 958, an at least two thresholded video frames are determined by applying the background image as a threshold to the at least two video frames.

At 960, a contour is determined from the at least two thresholded video frames. The contour operation provides a contour-detected area which, in the homecage, is generally the animal's position.

At 962, a centroid is determined for the contour on each frame. The centroid is the arithmetic mean position of the contour, and generally represents the midpoint of the animal.

At 964, a track plot of the animal around the homecage is determined from the line plot of the centroid values of each of the at least two thresholded video frames.

Figure 10:
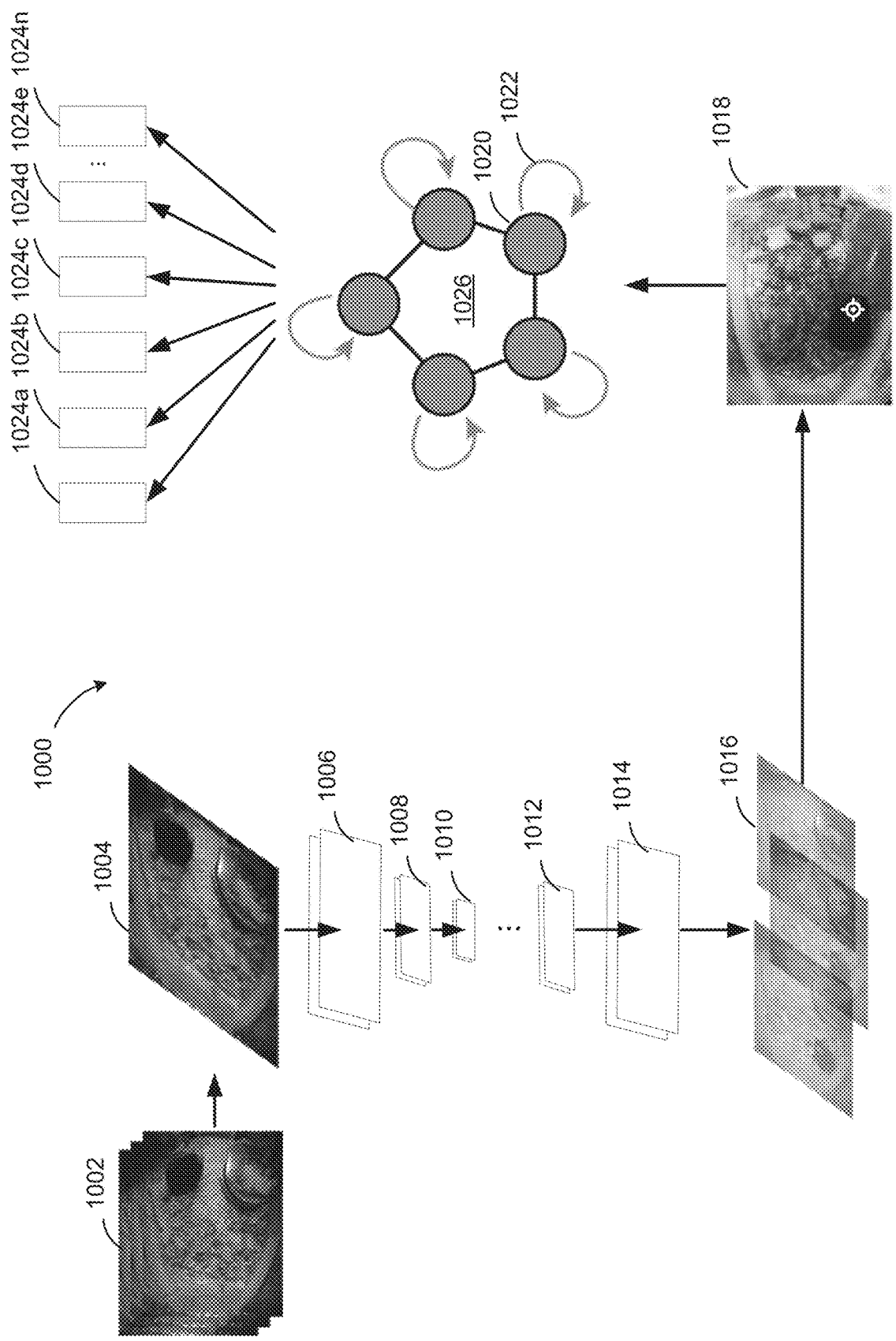
FIG. 10 is a data architecture diagram for automated homecage monitoring.

Referring to FIG. 10, there is a data architecture diagram 1000 for automated homecage monitoring. The architecture 1000 shows a two-stage prediction, where a first prediction is made related to an animal's pose estimate. The post estimation may include the position of body features of an animal, such as eyes, nose, ears, a tail, legs, etc. A second prediction of an animal's state is made based on sensor data and the pose estimate. The animal's state may include a behavioral state of an animal, a social state of an animal, a position state of an animal, a sleep state of an animal, and a biological state of an animal.

Data architecture 1000 shows a Deep Neural Network (DNN) architecture that uses a predictive model to predict an animal pose estimate. The pose estimate includes the location of animal body features in sensor data. A pose estimate is generally described as a graph of parts, where a particular node in the graph represents a particular visual feature associated with a body feature. To produce a pose estimate, the graph is fit to an image using flexible interconnections. The DNN may be DeepLabCut, developed by the Mathis Lab (http://www.mousemotorlab.org/deeplabcut).

A set of sensor data inputs 1002, such as video data having a plurality of video frames generally represented by image data that are provided as input. Each image 1004 has at least a first convolutional layer 1006 applied to it. Each convolutional layer 1006, 1008, 1010 represents a convolution or pooling operation applied to the input, and then the input data is passed to another convolutional layer, for example a second convolutional layer 1008, and then again, to a third convolutional layer 1010, etc. The outputs of each convolutional layer may be inputs to another convolution layer.

The DNN may have a predictive model having many convolutional or pooling layers, and the processing of the image to produce a pose estimate may involve the application of many convolutional layers to the input data. The image may be subsampled, i.e. the image may be subdivided and each portion of the image may analyzed by the DNN.

The predictive model may be generated by training using a data set having a set of labels applied. During training, each layer is convolved to determine an activation map of an applied label associated with the activating input for the layer. As a result, the convolutional layer builds an activation map of when the filter activates when it detects some specific feature in the image input. Each convolutional layer in the DNN stacks its activation map along the depth of the network.

In addition to the convolutional layers, the DNN may also have pooling layers and rectified linear unit layers as is known.

The DNN has deconvolutional layers 1012 and 1014. The deconvolutional layers 1012 and 1014 may be fully connected layers that provide high-level reasoning based on the output activations of the preceding convolutional layers.

The DNN generates pose predictions 1016. The pose predictions 1016 are used to determine animal feature locations 1018. The pose predictions correspond to the locations (or coordinates) in a video frame of particular animal body parts or indicia. The pose predictions 1016 may also include, for example, the location of a novel object such as a ball introduced into the homecage. The DNN may function to produce pose predictions (including animal feature locations) for more than one animal, for example, two animals may be located within the homecage.

The DNN may analyze the video input frame by frame. Each body part of the animal in the homecage may be tracked, and the DNN may produce a pose prediction. The DNN may be initially trained on a training set of labeled videos (containing the behaviors of interest). The initially trained DNN model may have further training data input until its pose prediction attains an acceptable accuracy metric.

The pose feature locations 1018 are used by a Recurrent Neural Network (RNN) 1026 to learn and predict particular sequences of animal body parts or indicia that identify states (including behaviors) that are more complex.

The RNN 1026 is a particular type of artificial neural network where nodes are connected into a directed graph The RNN may describe a neural network where there are feedback connections and feedforward connections between nodes, which may add memory to the neural network which can be used to predict temporally dependent phenomena. RNN 1026 nodes 1020 may have internal state store state data as part of processing a series of inputs. The RNN 1026 may be an Long-Short Term Memory (LSTM) network in which a node has an input gate, an output gate and a forget gate. Using the LSTM model, the network may learn the dynamics of animal (or animals) body parts that conform a particular behavior.

The RNN model may be a network which is capable of learning sequential information, and producing sequential predictions based on an input state. The learning of the RNN may classify the patterns of sequences of animal poses into particular behaviors of interest.

The RNN 1026 has nodes 1020 and transitions 1022, and processes a series of pose predictions 1018 corresponding to video frames 1002 and other sensor data.

The nodes 1020 in the RNN are then used to produce a prediction of an animal state 1024. The animal state prediction may include a behavioral state of an animal, a social state of an animal, a position state of an animal, a sleep state of an animal, and a biological state of an animal.

The transitions 1022 may be triggered based on changes in sensor data, pose predictions 1016 from the DNN, and pose feature locations 1018. The transitions 1022 may trigger a state change of the RNN 1026, and may change a predicted output animal state 1024.

A behavioral state of an animal may include particular activities, such as actions contemplated by a research study. These may include string pulling, interaction of an animal with a novel object introduced into the homecage, social interaction with other animals, animal interaction with a dark box, rearing, grooming, playing in the homecage, or other homecage activity. The behavior state may include other stereotyped movements in which motor function can be evaluated. The animal's interaction with a novel object may be used to determine a metric of the animal's curiosity.

The position state of an animal may include the animal's position and orientation within the homecage. The position state may be based on the location of the animal's body features or indicia.

The sleep state of an animal may include the animal's sleep/wake cycle, and any potential intermediary states.

The biological state may include food or water intake, respiration, urination, bowel movements, etc. The biological state may include a level of activity of the animal, for example when the animal is highly active, moderately active, or sedentary.

The RNN 1026 may track quantitative state information for the animal state. This may include the number of transitions 1022 into a state (or node) 1020, the length of time spent in a state (or node) 1020, or other metrics.

Figure 11A:
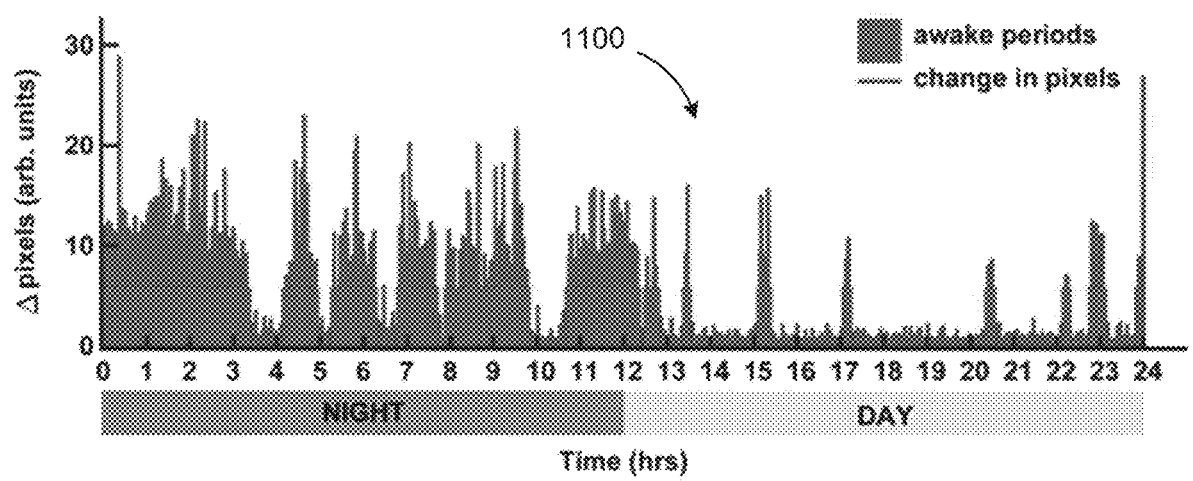
FIG. 11A is a graph diagram of an automated homecage monitoring system.

Referring to FIG. 11A, there is shown an example graph diagram 1100 of an automated homecage monitoring system. The example graph 1100 includes the output of an animal state as predicted by the automated homecage monitoring system of FIG. 9A. This example graph shows a metric associated with an animal's sleep/wake cycle. It is understood that any of the animal states may be graphed, more than one predicted state may be graphed on the same graph. The example graph 1100 shows a predicted animal state over a 24-hour period correlated to the number of changed pixels in a sensor input from a camera.

The example graph 1100 may be referred to as an actogram. Existing solutions to monitor homecage activity and state often delivered actograms based on running-wheel statistics. The present homecage monitoring system allows researchers to evaluate additional behavioral parameters beyond those captured using running wheel measurements.

The graph 1100 may be included in the report generated by the automated homecage monitoring system. The report may also include other metrics and measurements from the homecage monitoring system.

Figure 11B:
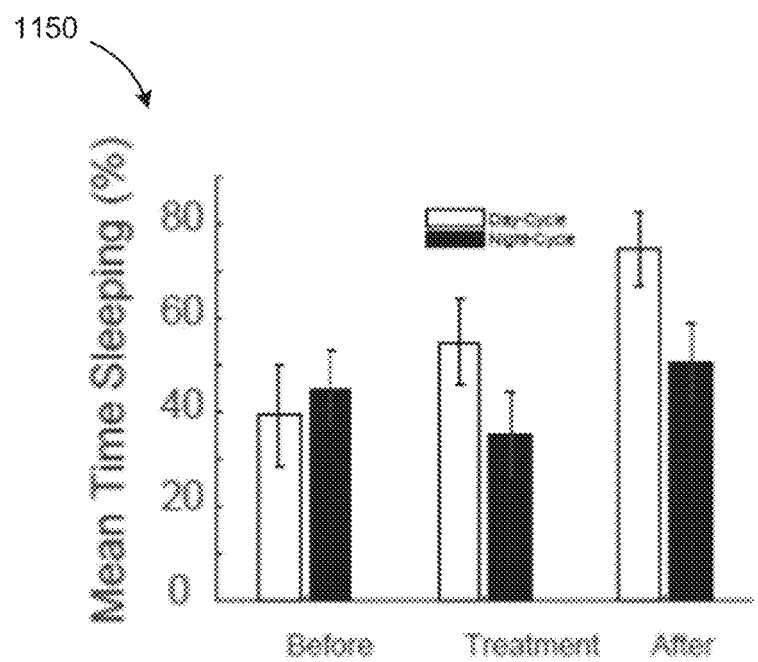
FIG. 11B is a graph diagram of an automated homecage monitoring system.

Referring to FIG. 11B, there is shown another example graph diagram 1150 of an automated homecage monitoring system. The example graph diagram 1150 shows sleep detection before, during and after a treatment for an animal in a homecage. The homecage monitoring system may function to track animal state such as sleep/wake cycles to determine research data for medical treatments. In the example diagram 1150, bars denote the mean percentage amount of time that the animal spent sleeping during the light (white) and dark cycle (black) based on the predicted animal state of the homecage monitoring system. The error bars denote the standard error of the mean (SEM).

Figure 12A:
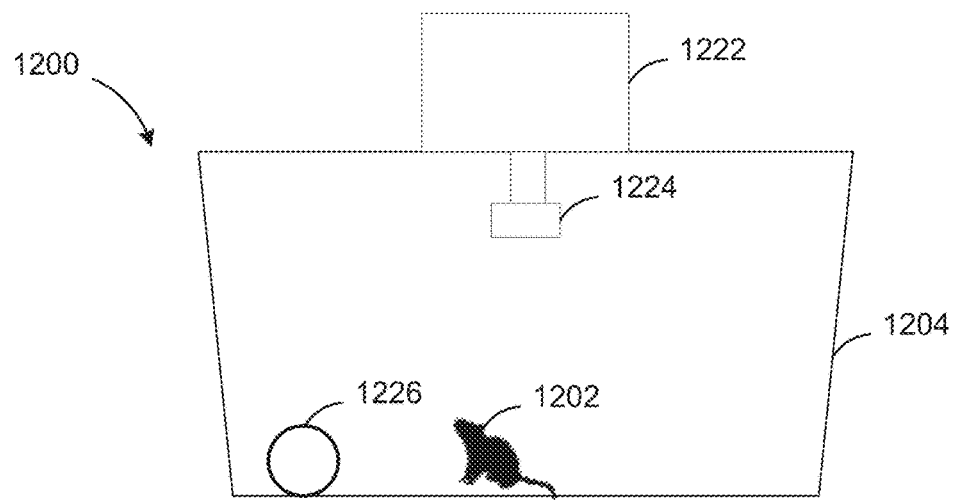
FIG. 12A is a front view of another homecage having an object.

Referring to FIG. 12A, there is a front view of another homecage 1200 having an object. The homecage 1200 has an animal 1202 disposed inside it, a microcontroller 1222, at least one sensor 1224 connected to the microcontroller, and a novel object 1226. The homecage monitoring system may collect sensor data to predict and track the position of the novel object 1226. The position of the novel object 1226 and the position of the animal 1202, in addition to the pose estimates of the animal, may be used to predict the interactions of the animal 1202 with the novel object 1226. These predicted interactions may be an animal behavioral state such as "exploring". In addition to the predicted animal state, metrics relating to the interaction of the animal 1202 and the novel object 1226 may be determined. For example, the duration of time, the number of interactions, and other particular metrics associated with the behavior.

Figure 12B:
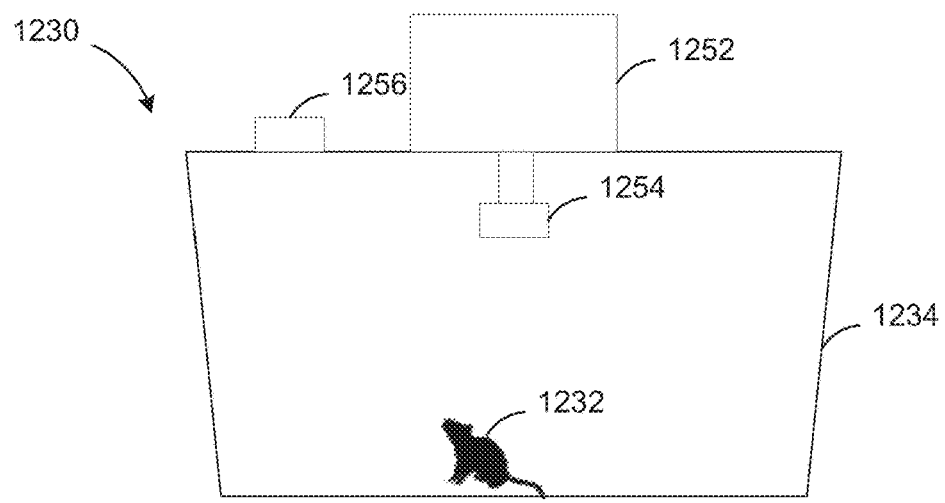
FIG. 12B is a front view of another homecage having an actuator.

Referring to FIG. 12B, there is a front view of another homecage 1230. The homecage 1230 has an animal 1232 disposed inside it, a microcontroller 1252, at least one sensor 1254 connected to the microcontroller, and an actuator 1256. The actuator 1256 is connected to the microcontroller 1252, and may be activated based on user input, or based on a predicted behavior. The activation of the actuator 1256 may be automatic based on a closed feedback loop and may activate based on a pre-determined condition. The predetermined condition may be based on a predicted animal state, a particular duration of a predicted animal state, or based on another metric determined by the homecage monitoring system.

The actuator 1256 may be a haptic actuator, a linear actuator, a pneumatic actuator, a buzzer, a speaker, a thermal actuator, a piezoelectric actuator, a servomechanism, a solenoid, a stepper motor, or the like.

In one example, the actuator is a haptic actuator and the homecage monitoring system may be used for a sleep experiment. In such an example, the actuator may be used to wake an animal 1232 after a pre-determined sleep duration. The animal state prediction may be used in this example to automatically actuate the actuator and monitor the animal's subsequent behavior. The haptic actuator may use a driver DRV2605 and a vibration motor disc. The actuator 1256 may be attached to the outside walls 1234 of the homecage 1230, close to the nest location, the actuator may be attached inside (not shown) the homecage 1230 as required by experimental design. The actuator 1256 may be connected to the microcontroller 1252 directly, and the direct connection may include both data and power signals. The actuator 1256 may alternatively be wirelessly connected to the microcontroller 1252, and may be battery powered. This actuator may be used to gently wake-up the animal 1232 in the homecage. In the above example, the haptic vibration device may have a vibration dampening film (not shown) such as silicon disposed between it and the homecage to dampen the vibrations produced by this device so as to avoid disturbing the neighboring cages.

Figure 12C:
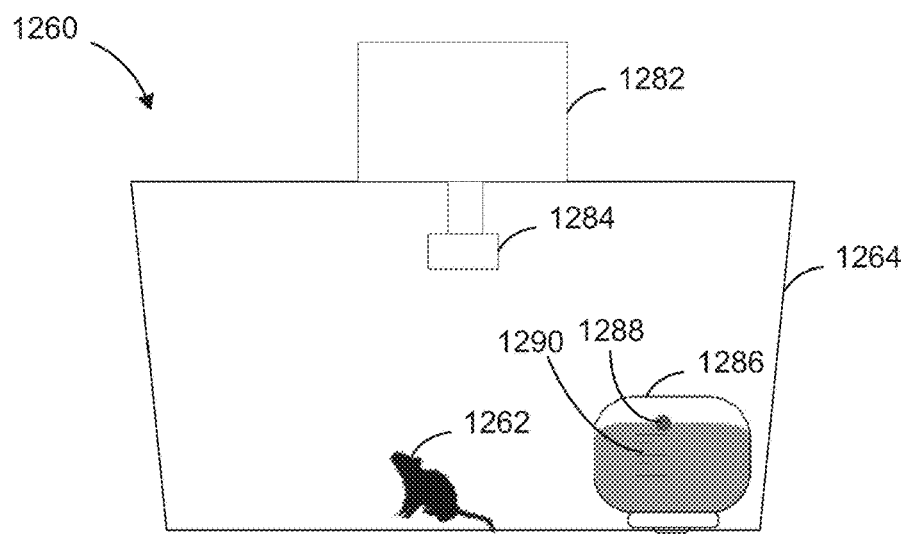
FIG. 12C is a front view of another homecage having a water tank.

Referring to FIG. 12C, there is a front view of another homecage 1260 having a water tank. The homecage 1260 has an animal 1262 inside it, a microcontroller 1282, at least one sensor 1284 connected to the microcontroller 1282, and a water tank 1286.

The water tank 1286 has a plurality of gradations 1290 and a salient floating device 1288 for measuring the water level within. The microcontroller 1282 may collect sensor data such as video frames from the at least one sensor 1284, and use the state prediction method recited herein to determine a water level for an animal 1262.

While a water tank 1286 is shown, it is appreciated that the tank 1286 could be filled with another consumable such as food. In such a case, the state prediction method may determine a food level. For example, the food level and water level may be determined using a laser position sensor or a laser proximity sensor.

A water level prediction or a food level or a bedding status prediction (or other husbandry variables) by the homecage monitoring system 1260 may trigger a report or an alert to a user. For example, when the water tank is below a threshold, the homecage monitoring system 1260 may send an alert to a user to refill the water.

Figure 13:
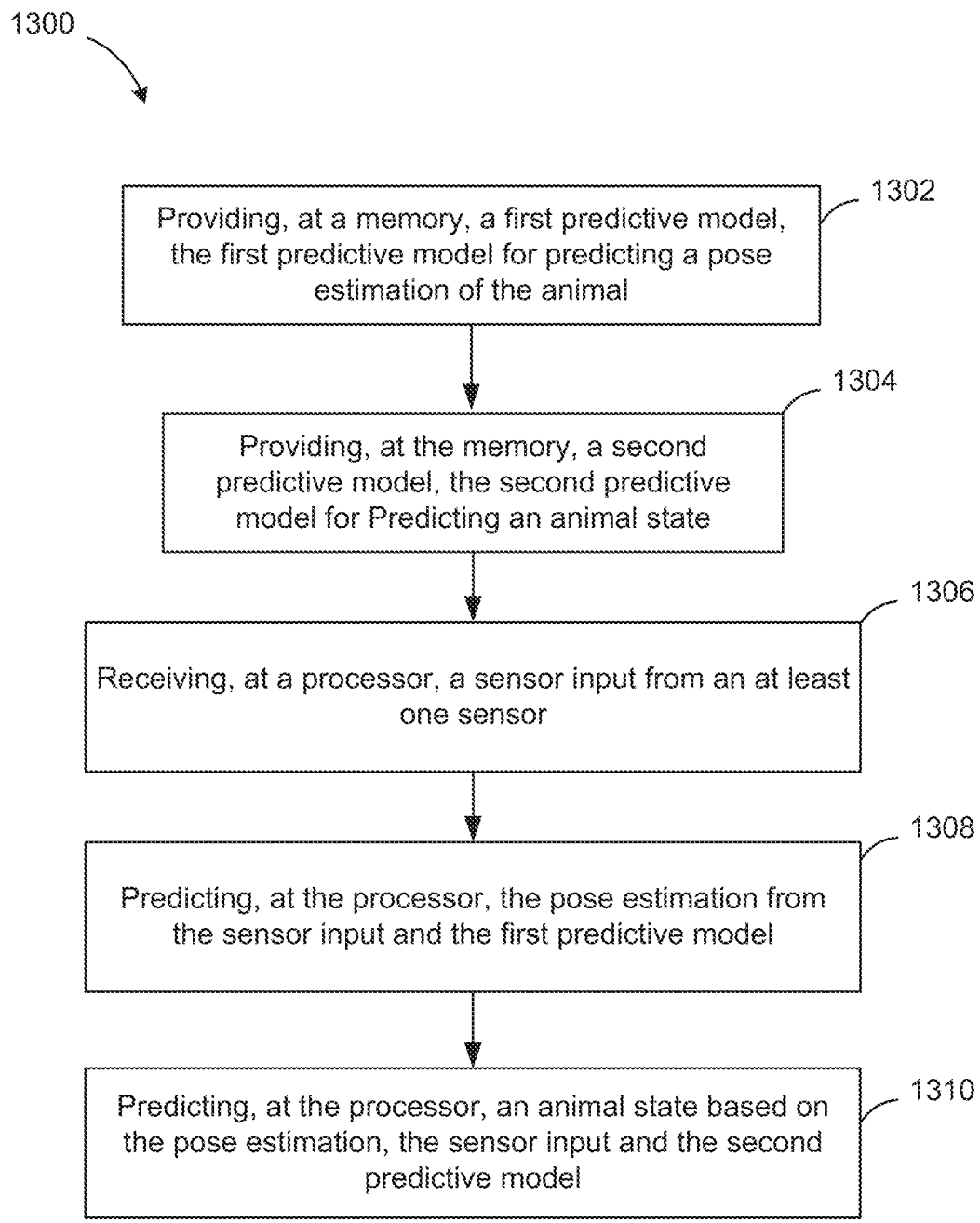
FIG. 13 is a method diagram for automated homecage monitoring.

Referring to FIG. 13, there is a method diagram 1300 for automated homecage monitoring.

At 1302, a first predictive model is provided at a memory, the first predictive model for predicting a pose estimate of the animal.

At 1304, a second predictive model is provided at the memory, the second predictive model for predicting a state of the animal.

At 1306, a sensor input is received at a processor from an at least one sensor.

At 1308, the pose estimate is predicted at a processor from the sensor input and the first predictive model. Optionally, the pose estimate may include the position of an at least one indicia indicating the body parts, or physical features of the animal in the homecage. The pose estimate may be a connected graph mapped onto the sensor data and identifying the coordinates of the identified indicia as nodes connected to the other indicia identified on the animal.

At 1310, an animal state is predicted at a processor based on the pose estimate, the sensor input and the second predictive model. The pose estimate may be based on the position of at least one indicia associated with an animal in the homecage. The predicted animal state may include at least one of a behavioral state of an animal, a social state of an animal, a position state of an animal, a sleep state of an animal, and a biological state of an animal. The animal state may be used to determine at the processor, a report based on at least one of the animal state, the pose estimate, the sensor input, and the position of the at least one indicia. The report may be stored in a database that is in communication with a memory. The report, the pose estimate, and the position of the at least one indicia may correspond to a common timebase. The output may be output, including to a display device or to a server via network communication. The prediction of pose estimate, and the prediction of animal state may be performed by the microcontroller generally contemporaneously with the sensor input collection. Alternatively, the prediction may be performed generally after the sensor input collection.

Furthermore, the generating the predicted animal pose may also include determining metrics or other data associated with the animal state. This may include, for example, a start time (including a start time of a new animal state when there is a state transition), an end time (including an end time of the current animal state), a duration (or elapsed time), a frequency, any associated sensor data or pose estimate. Further, an occupancy map including an animal's movement path within the homecage (see e.g. FIG. 7) may be included in the report. The occupancy map may be annotated using the pose estimate, and any predicted animal states. An animal's speed may be determined and included in the report from their movement in the homecage. If a novel object has been introduced into the homecage, it's position, movement, and animal's interactions may be included in the report. The animal's food and water supply levels may be included in the report. The status of the bedding in the homecage may be included in the report.

Depending on experimental design, an actuator may be connected to the homecage monitoring system, and attached to the homecage (or positioned proximate to the homecage). From a predicted animal state, the actuator may be activated. The report may include information relating to the actuator activations.

The prediction of pose estimate may be performed using a DNN as described in FIG. 10. The prediction of animal state may be performed using an RNN as described in FIG. 10.

Figure 14:
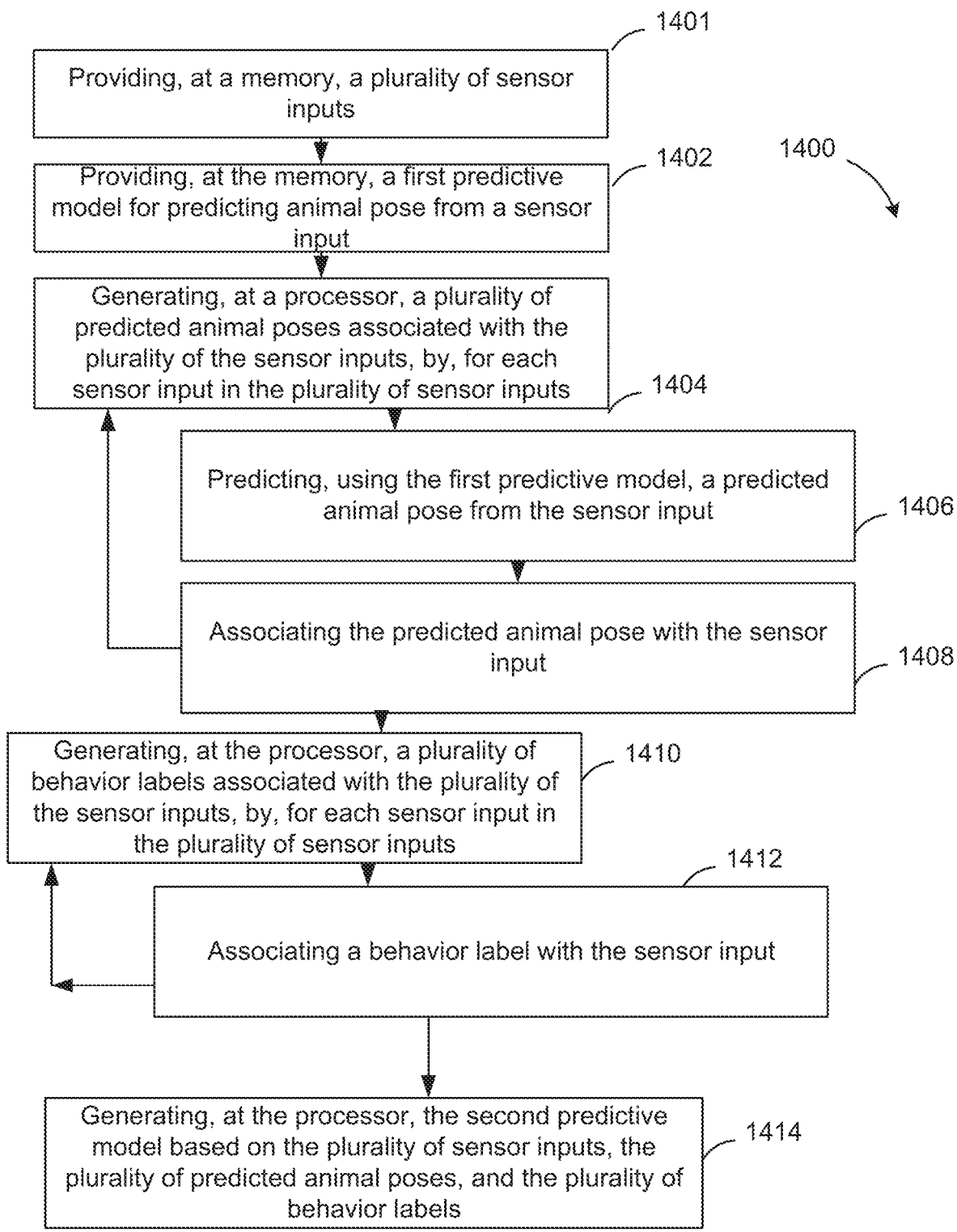
FIG. 14 is a method diagram for automated homecage monitoring.

Referring to FIG. 14, there is a method diagram 1400 for automated homecage monitoring.

At 1401, a plurality of sensor inputs are provided at a memory.

At 1402, a first predictive model for predicting animal pose from a sensor input is provided at the memory.

At 1404, a plurality of predicted animal poses are associated with the plurality of the sensor inputs is generated at a processor, by, for each sensor input in the plurality of sensor inputs, at 1406, using the first predictive model to predict a predicted animal pose from the sensor input, and at 1408 associating the predicted animal pose with the sensor input.

At 1410, a plurality of behavior labels associated with the plurality of the sensor inputs are generated at the processor, by, for each sensor input in the plurality of sensor inputs: at 1412, associating a behavior label with the sensor input. Optionally, the sensor input is displayed to a user at a display device and the user submits the behavior label for the sensor input using an input device. This labelling by a user may be considered "supervised learning", where a human guides the training of a predictive model.

At 1414, the second predictive model is generated based on the plurality of sensor inputs, the plurality of predicted animal poses, and the plurality of behavior labels.

Referring to FIGS. 15-34, there are shown a plurality of user interfaces of the homecage monitoring system. These user interfaces may be provided by a web server associated with server 104 (see FIG. 1). The user interfaces may be provided by a client application running on either of user devices 106 and/or 116, and the client application may connect to server 104 (see FIG. 1) via an Application Programming Interface (API).

Figure 15:
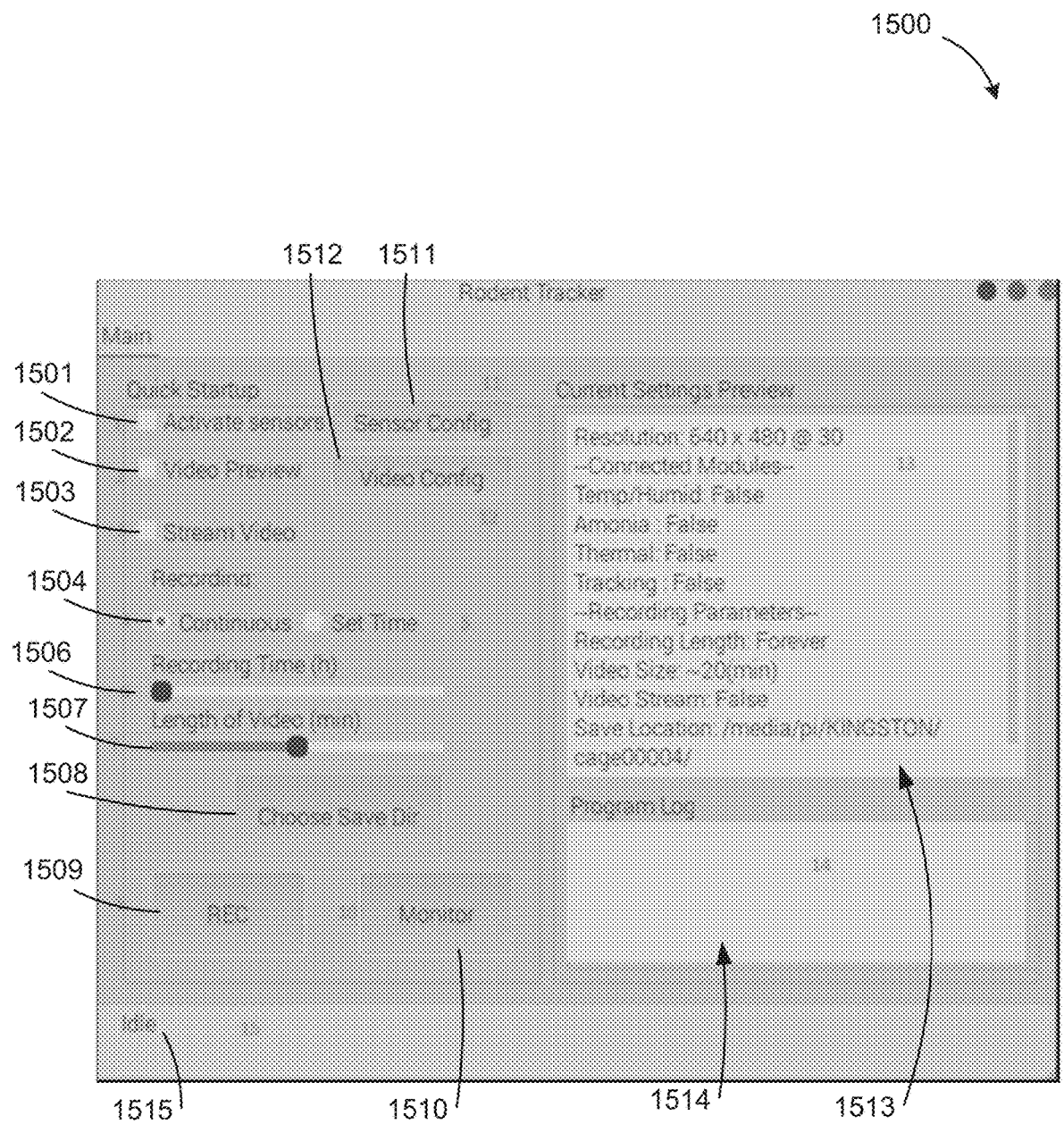
FIGS. 15-34 are user interfaces associated with the automated homecage monitoring system.

Referring next to FIG. 15, there is shown a user interface 1500 of a homecage monitoring system in accordance with at least one embodiment. The user interface 1500 may be a landing page displayed to a user when the homecage application is started or initially accessed. The user interface 1500 may provide a dashboard with information provided in an easy to read manner so that the user can understand quickly the state of the homecage management system. The user interface 1500 may have a plurality of user input controls.

The activate sensors control 1501 may enable any sensors that have been turned on in the sensor configure menu 1511.

The video preview control 1502 may enable a video preview that will display a camera preview.

The stream video control may enable the live stream when recording is started

The user interface 1500 may have a plurality of recording settings.

A continuous control 1504 may allow for continuous recording to run until it is stopped. When the continuous control 1504 is set to time the length of recording time may be changed.

A recording time control 1506 may configure how long the recording will run for. When timer is finished recording may cease.

A length of video 1507 may configure the length of each video segment in minutes. If recording time=1 hr, and length of video=10, the system may record 6, 10-minute segments.

A save directory control 1508 may open the choose save directory window to pick where files are saved.

A record control 1509 starts the recording with the current settings. If pressed again, it stops the recording.

A monitor control 1510 starts the monitor only without recording to disk.

A sensor config control 1511 may open the sensor config window.

A video config control 1512 may open the video config window.

A settings preview 1513 may display a box that contains the current settings selected for the application. This includes video settings, which sensors are enabled and the current file save location.

A program log preview 1514 may keep a log of the tasks that the app is completing. For example: The time a recording was started or stopped.

A status bar 1515 may inform the user what the app is doing at the moment (idle, recording, finished).

Figure 16:
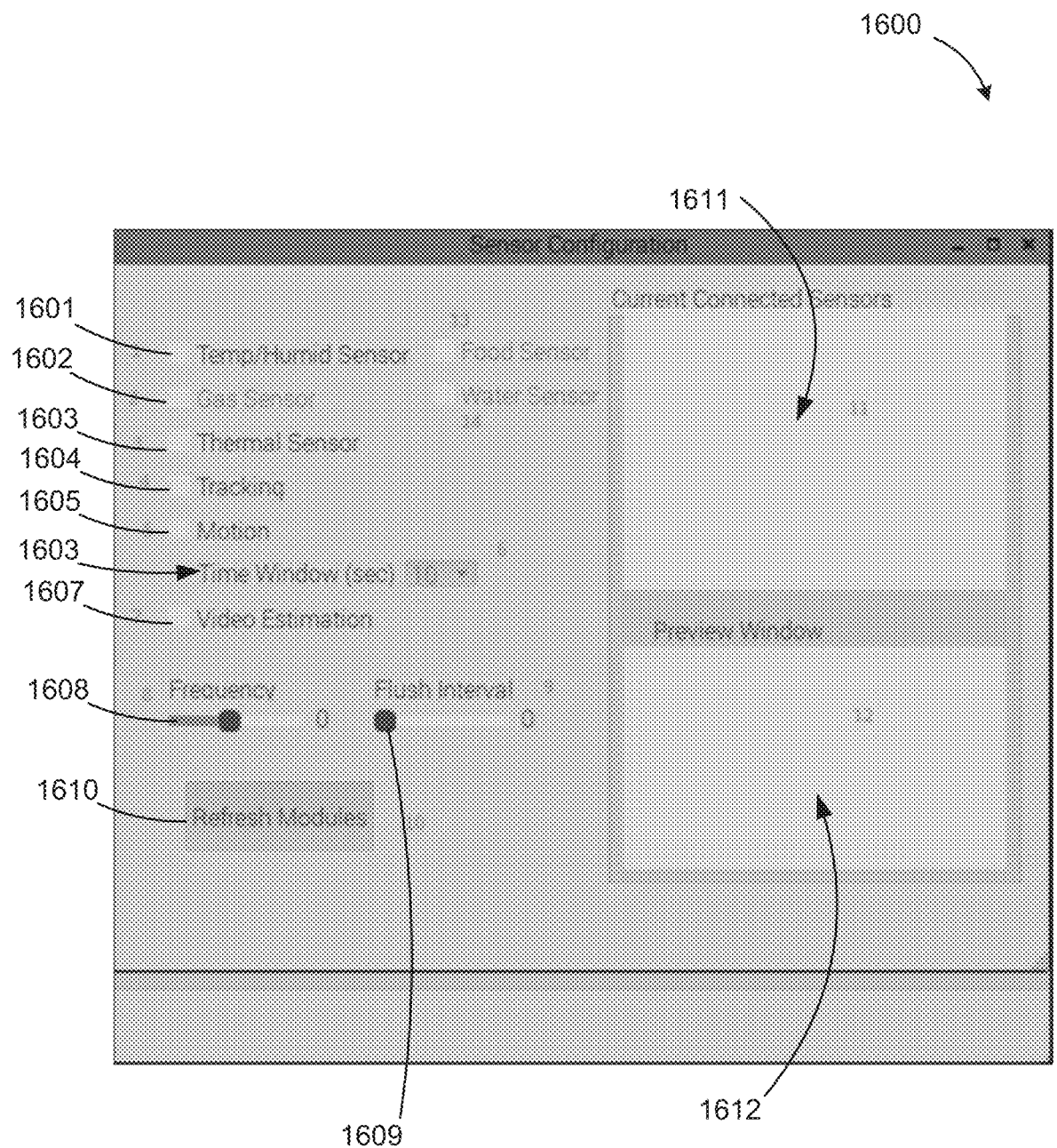

Referring next to FIG. 16, there is shown another user interface 1600 of a homecage monitoring system in accordance with at least one embodiment. The user interface 1600 may show the sensor configuration window corresponding to a selection of the sensor config control 1511 (see FIG. 15) by the user.

The sensor config interface 1600 may allow for a variety of sensor settings for each homecage.

A temp/humidity sensor control 1601 may enable the temperature and humidity sensor. This sensor may monitor temperature and humidity in the homecage environment.

A gas sensor control 1602 may enable the ammonia sensor. This sensor may monitor the concentration of ammonia in the homecage.

A thermal sensor control 1603 may enable the thermal camera.

A tracking control 1604 may enable motion tracking in the homecage.

A motion control 1605 may enable the collection of motion data from video.

A time window control 1603 may control the length of the time window of motion that is accumulated.

A video estimation control 1607 may enable the collection, estimation and event creation based on the monitoring of all the variables (sensors). This may include: water level estimation, food level estimation, bedding quality (feces and ammonia). Checking this box may also enable the event detection for when these variables are out of normal range (anomaly detection).

A frequency slider control 1608 may be used to determine the frequency of event detection.

A flush interval control 1609 may be used to determine how often the system should clean its local files to preserve space.

The refresh modules control 1610 may be used to refresh the connected modules.

The sensor preview 1611 may show a preview box that displays what sensors are enabled.

Figure 17:
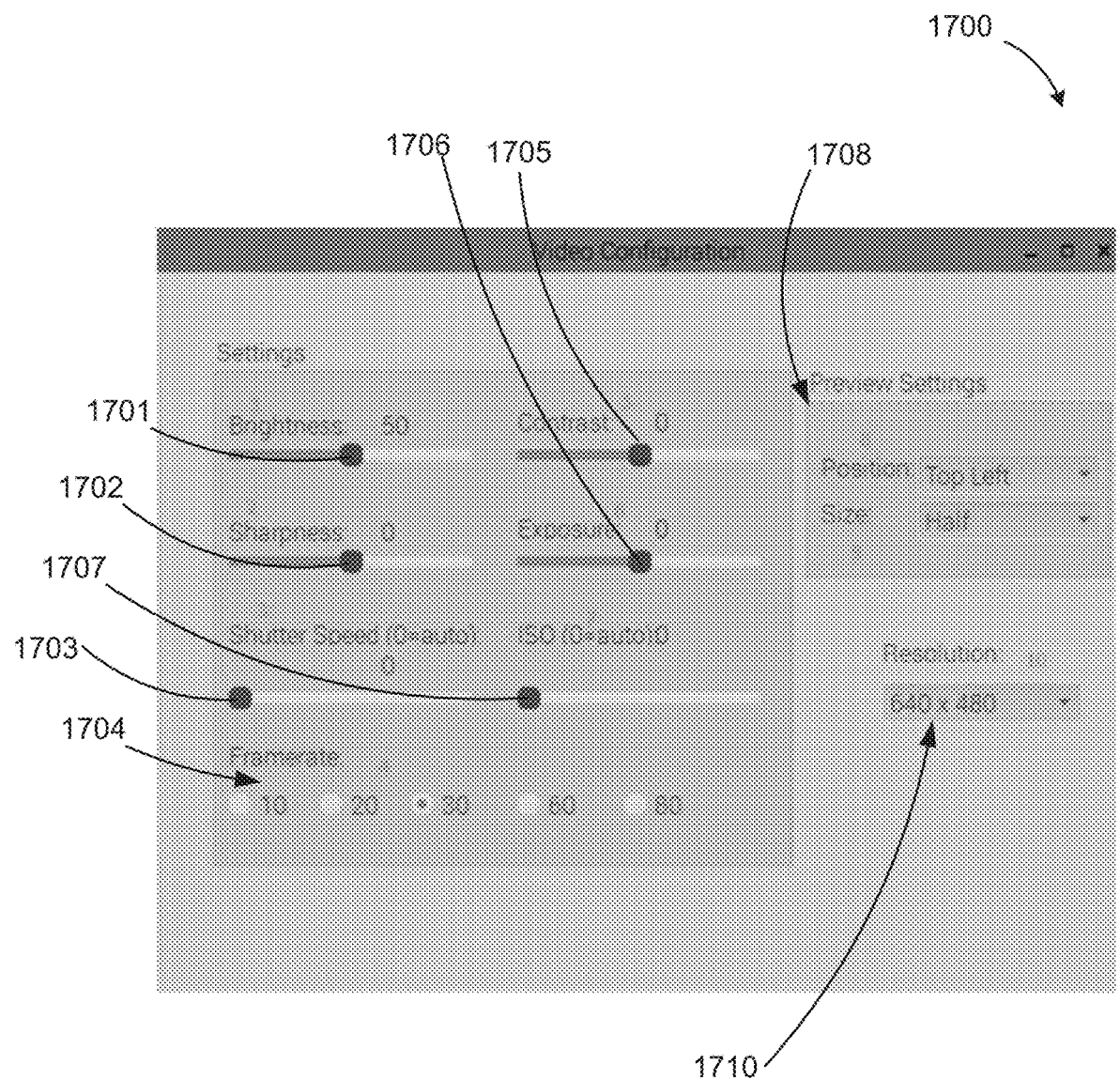

Referring next to FIG. 17, there is shown another user interface 1700 of a homecage monitoring system in accordance with at least one embodiment. When video configuration control 1512 (see FIG. 15) is pressed the interface 1700 may be displayed. The user interface 1700 may be used to change the connected camera settings. Settings changes here may reflect immediately when the preview checkbox is pressed.

A brightness control 1701 may be used to change the brightness of the camera by sliding the slider.

A sharpness control 1702 may be used to change the sharpness of the camera by sliding the slider.

A shutter speed control 1703 may be used to change the shutter speed of the camera.

A framerate control 1704 may be used to decide the frame capture rate of the camera. Default may be 30. When recording at certain resolutions, the framerate may be changed as required.

A contrast control 1705 may be used to change the contrast of the camera.

An exposure control 1706 may be used to change the exposure of the camera.

An ISO control 1707 may be used to change the camera sensitivity to light.

Preview settings 1708 may include a position control for the current position of the camera preview in relation to the screen, and a size control for changing the size of the preview window.

A resolution control 1710 may be used for changes to the resolution of the camera for recording.

Figure 18:
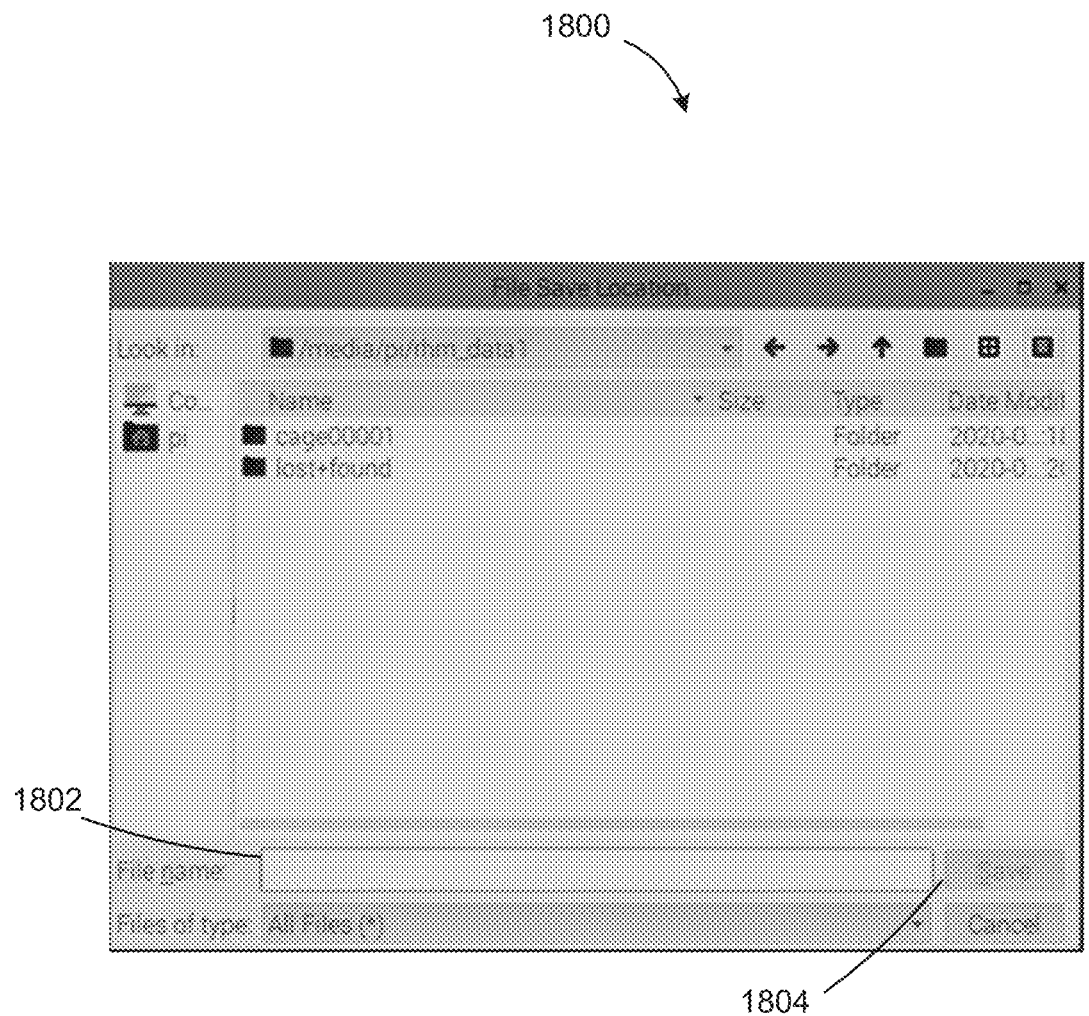

Referring next to FIG. 18, there is shown another user interface 1800 of a homecage monitoring system in accordance with at least one embodiment. The file save interface 1800 may be shown when a user selects save directory control 1508 (see FIG. 15). This save directory window may allow a user to specify the location of recorded data from the plurality of homecages.

Figure 19:
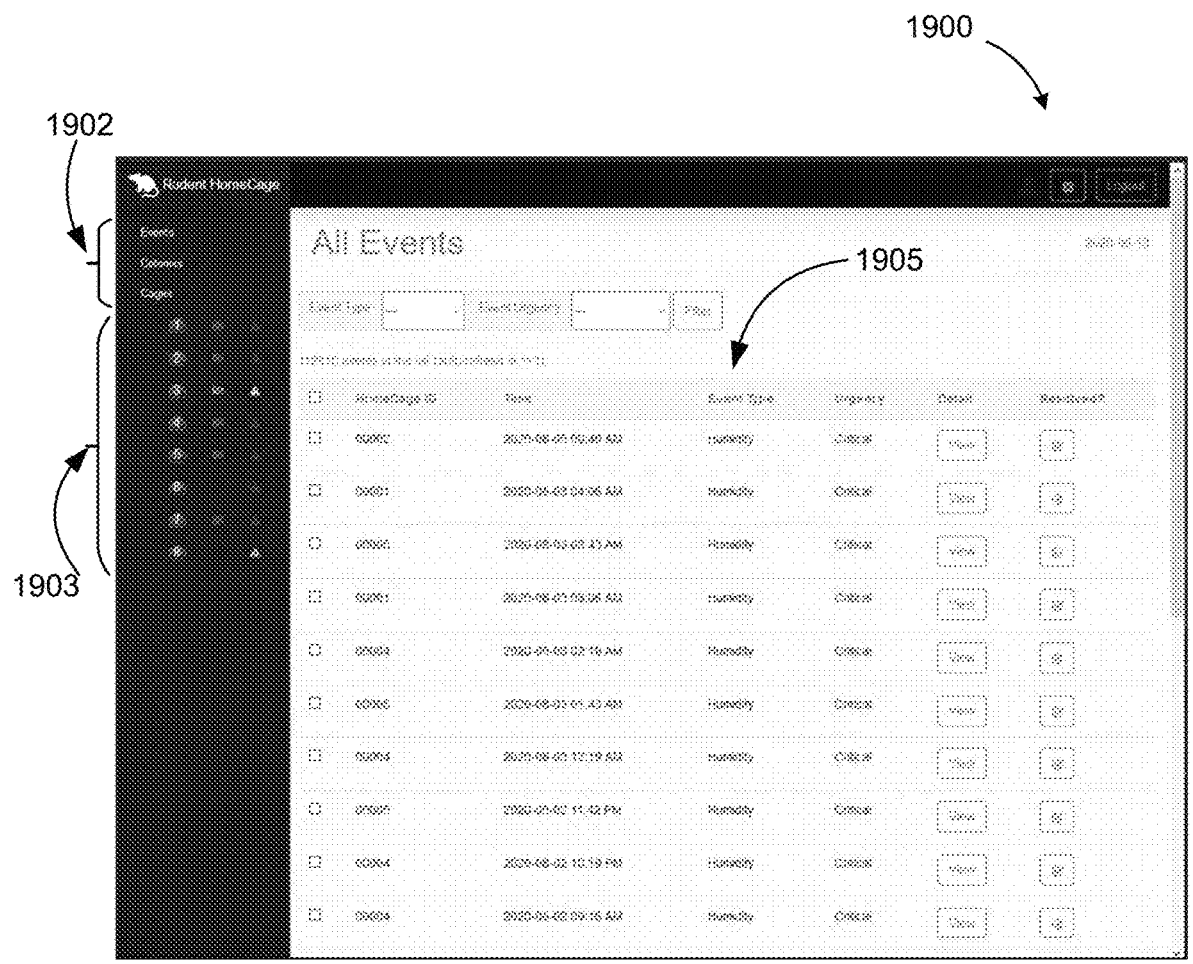

Referring next to FIG. 19, there is shown another user interface 1900 of a homecage monitoring system in accordance with at least one embodiment. The user interface 1900 may provide the user with the required functionality to administer the homecages in the rodent colony and also to display, monitor and analyze the collected information. The administration functionality may include: adding/removing/modifying information about particular homecages and colonies. Information for each homecage may be viewed, displayed, monitored and analyzed by clicking or selecting on one of the homecages in the list. This information may include water and food levels, bedding quality and animal motion.

The homecage monitoring system may have user accounts setup individual for each user. The homecage monitoring system may have role-based access control, and may provide for different types of users such as a colony administrator, a technician, and a researcher. The different types of users may view different types of information. For example, for the admin user, the system may allow homecages to be added, animals to be added, etc. Continuing the example, a technician user may be presented with quick reports of particular homecages that report anomalies. Finally in this example, an experimenter user may be provided more detailed analysis of animal behavior in the homecage or colony.

A navigation widget 1902 may allow a user to navigate to a listing of colonies, cages, and events.

A quick link widget 1903 may allow a user to navigate to one of the homecages with outstanding alerts.

A listing 1905 of each of the homecages and associated information may be provided, with links to the homecages.

Figure 20:
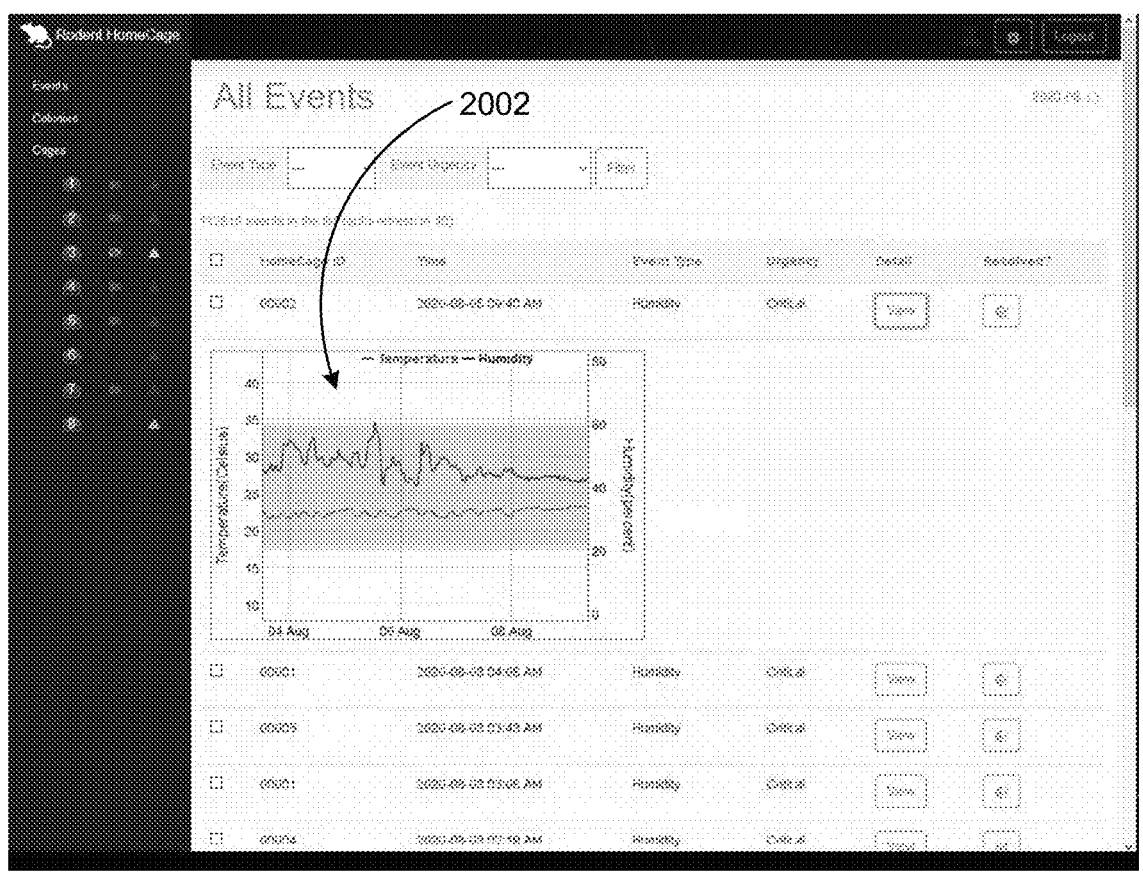

Referring next to FIG. 20, there is shown another user interface 2000 of a homecage monitoring system in accordance with at least one embodiment. The homecage data display interface 2000 may show one or more graphs 2002 of activity and measured data from a particular homecage. The homecage interface 2000 may be displayed when a user selects one homecage from the listing 1905 or the quick link widget 1902 (see FIG. 19). Furthermore, the user interface 2000 may include a listing of detecting events in the homecage including any alarms.

Figure 21:
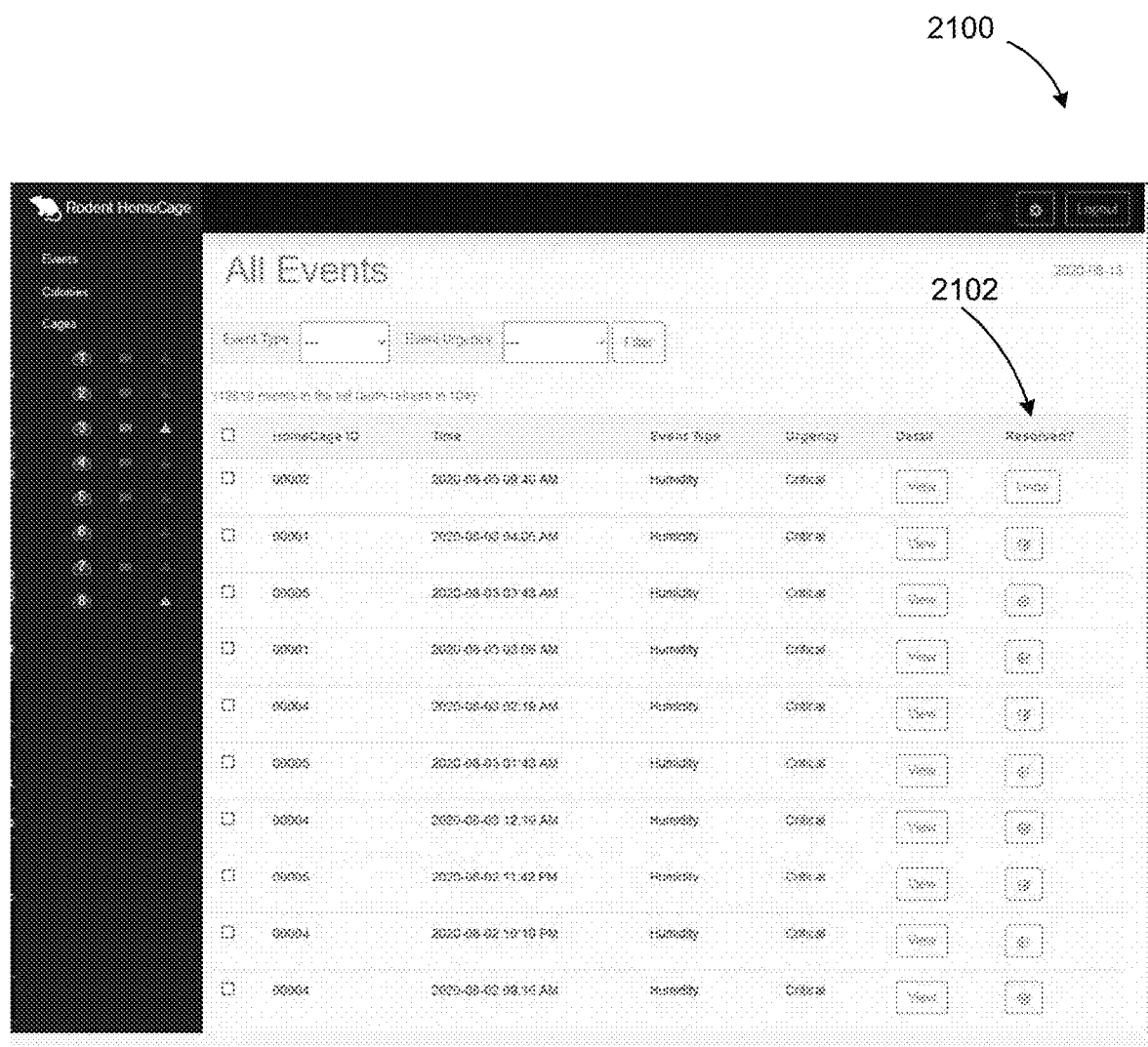

Referring next to FIG. 21, there is shown another user interface 2100 of a homecage monitoring system in accordance with at least one embodiment. The alarm interface 2100 shows listing 1905 (see FIG. 19) and may allow a user to confirm that an alarm for a homecage has been addressed. Once selected, a user may undo the operation as shown.

Figure 22:
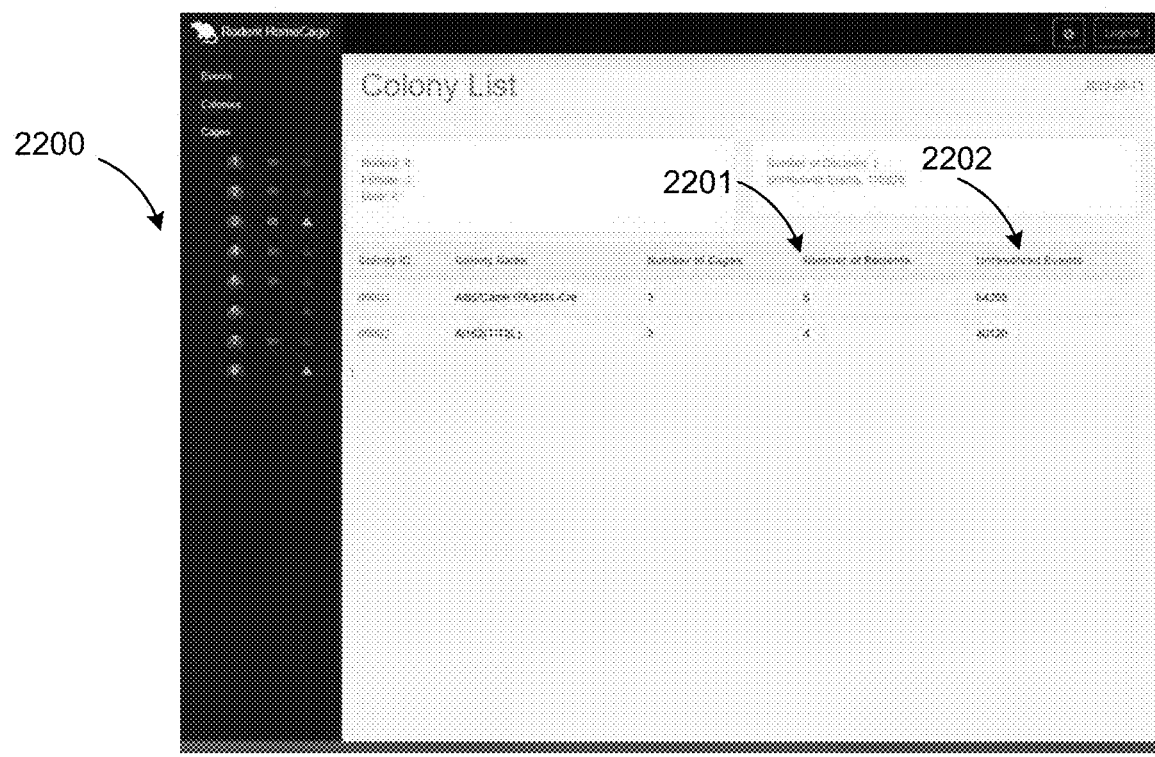

Referring next to FIG. 22, there is shown another user interface 2200 of a homecage monitoring system in accordance with at least one embodiment. The user interface 2200 may show a colony listing 2201, such that multiple different colonies of homecages may be monitored. Each colony may have a plurality of homecages. Information regarding unresolved alarms 2202 in all colonies may be indicated.

Figure 23:
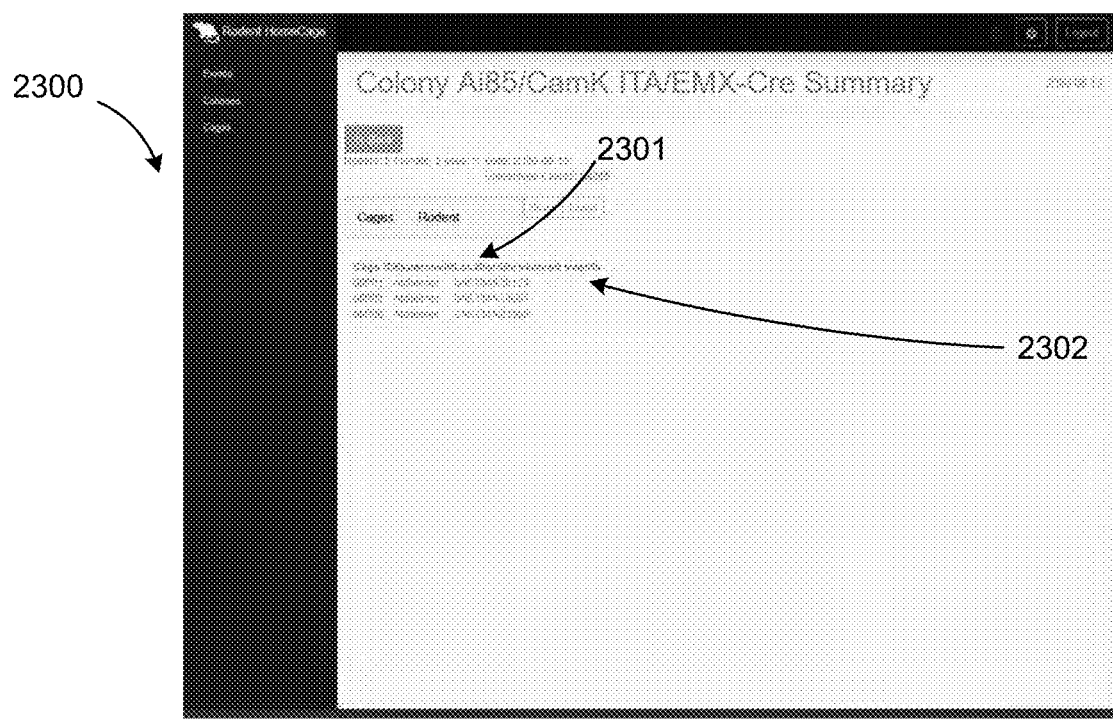

Referring next to FIG. 23, there is shown another user interface 2300 of a homecage monitoring system in accordance with at least one embodiment. The colony interface 2300 may show a listing 2301 of a plurality of homecages in the colony, along with relevant information and statistics collected from the colony. This may include information about unresolved alarms 2302 in the colony. The colony interface 2300 may further be used to navigate to the homecage interface of each homecage in the colony by selecting it from listing 2301.

Figure 24:
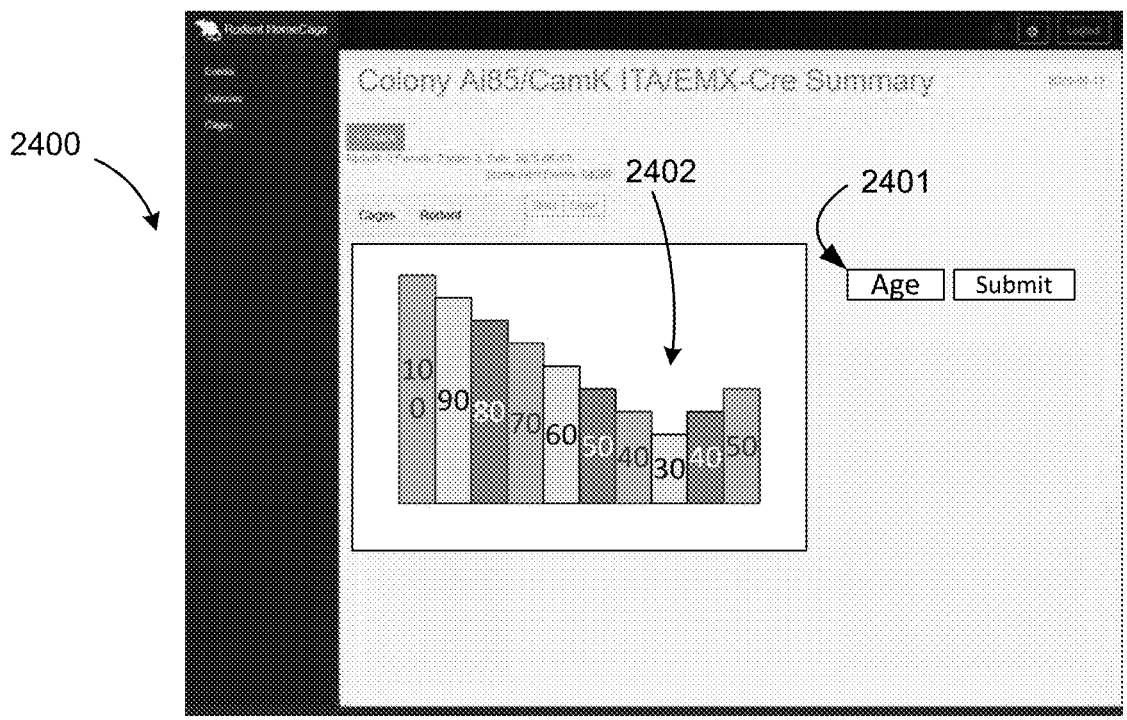

Referring next to FIG. 24, there is shown another user interface 2400 of a homecage monitoring system in accordance with at least one embodiment. The colony statistics interface 2400 may show a summary of statistics of the plurality of homecages in a colony. This may include statistics on the animal characteristics (sex, age, etc.), or any other determined values (activity level, movement level, strain level, states, etc.) for the homecages as described herein. A filter interface 2401 may be provided in order to allow a user to display the plurality of characteristics and determined values of the colony. A graph of the selected characteristics or determined values 2402 may be shown.

Figure 25:
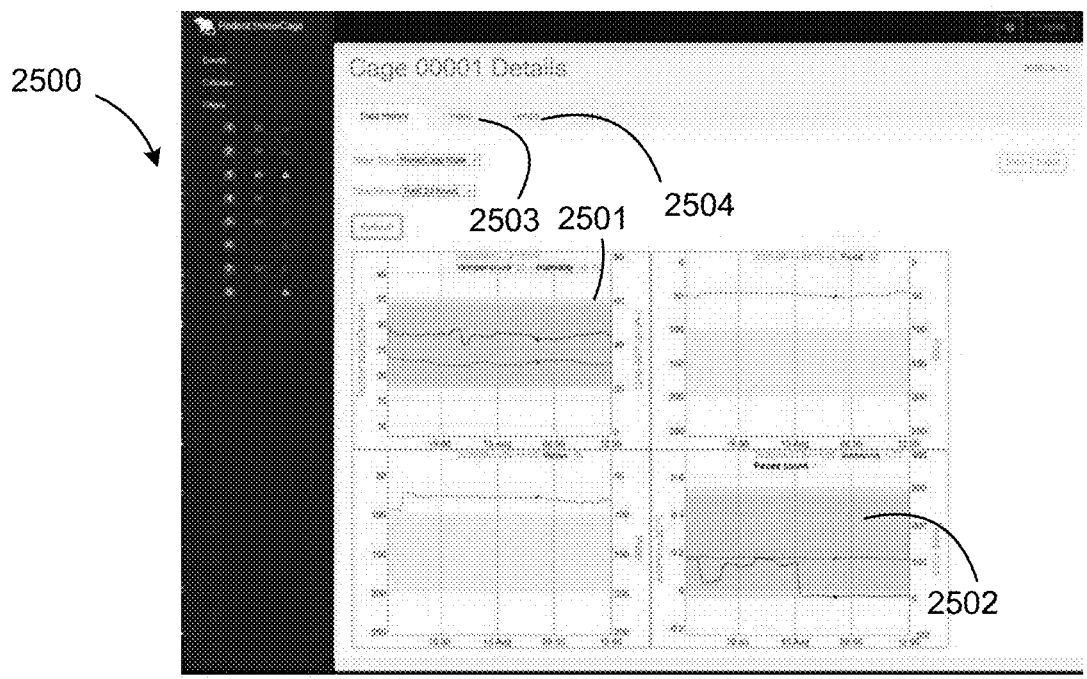

Referring next to FIG. 25, there is shown another user interface 2500 of a homecage monitoring system in accordance with at least one embodiment. A homecage detail interface 2500 may show information about a particular homecage. This may include, as noted above, animal characteristics (sex, age, etc.), or any other determined value (activity level, movement level, strain level, stages, etc) as disclosed herein.

A cage plot control 2501 may show determined graphs for the homecage.

An animal plot control 2502 may show animal related graphs for each of the animals in the homecage.

An unresolved alarm indicator 2504 may indicate if there are unresolved alarms for that homecage.

A streaming control 2503 may show a live video stream from the homecage.

Figure 26:
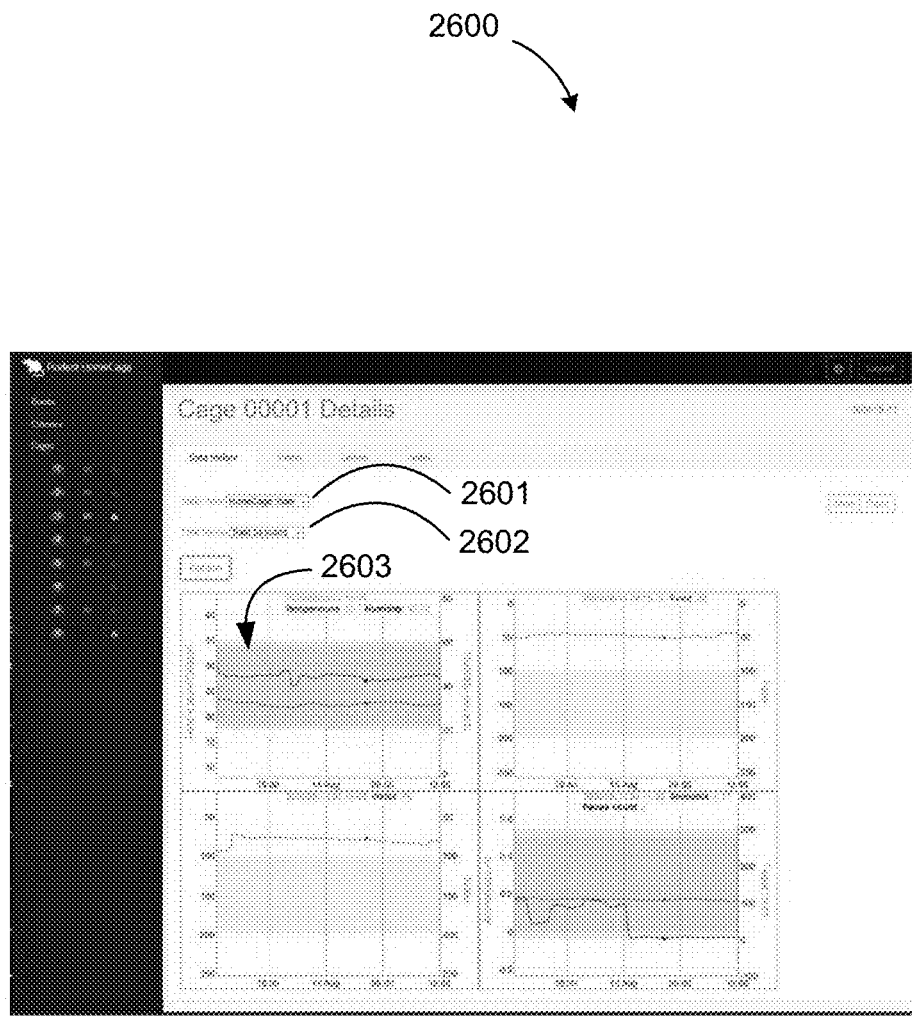

Referring next to FIG. 26, there is shown another user interface 2600 of a homecage monitoring system in accordance with at least one embodiment. Responsive to a cage plot control 2501 (see FIG. 25) selection, the cage plot interface 2600 may be shown. This may include data, statistics, and graphs 2603 related to the homecage. A table type control 2601 and time period control 2602 may allow a user to change the parameters for the data, statistics, and graphs 2603. Different types of plots may include sensor data (temperature, humidity, etc.), video data (water, food, bedding quality) and motion data.

Figure 27:
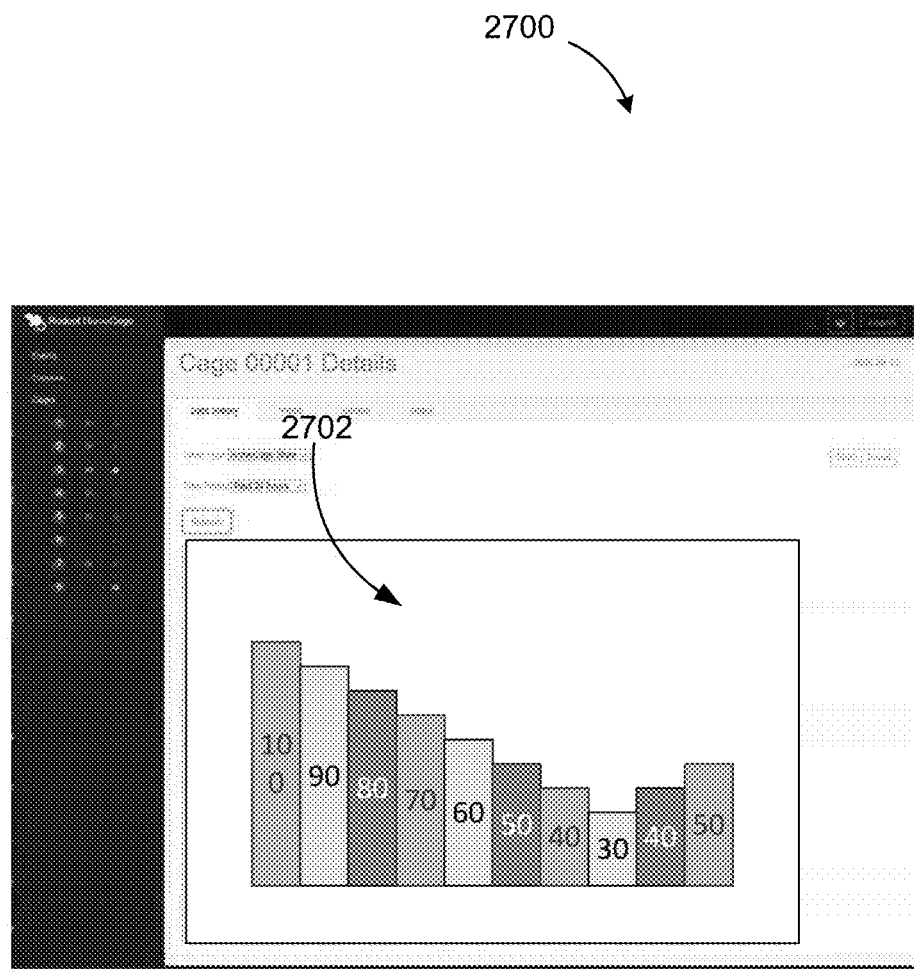

Referring next to FIG. 27, there is shown another user interface 2700 of a homecage monitoring system in accordance with at least one embodiment. The user interface 2700 may show an alternate graph display 2702 of data from a homecage.

Figure 28:
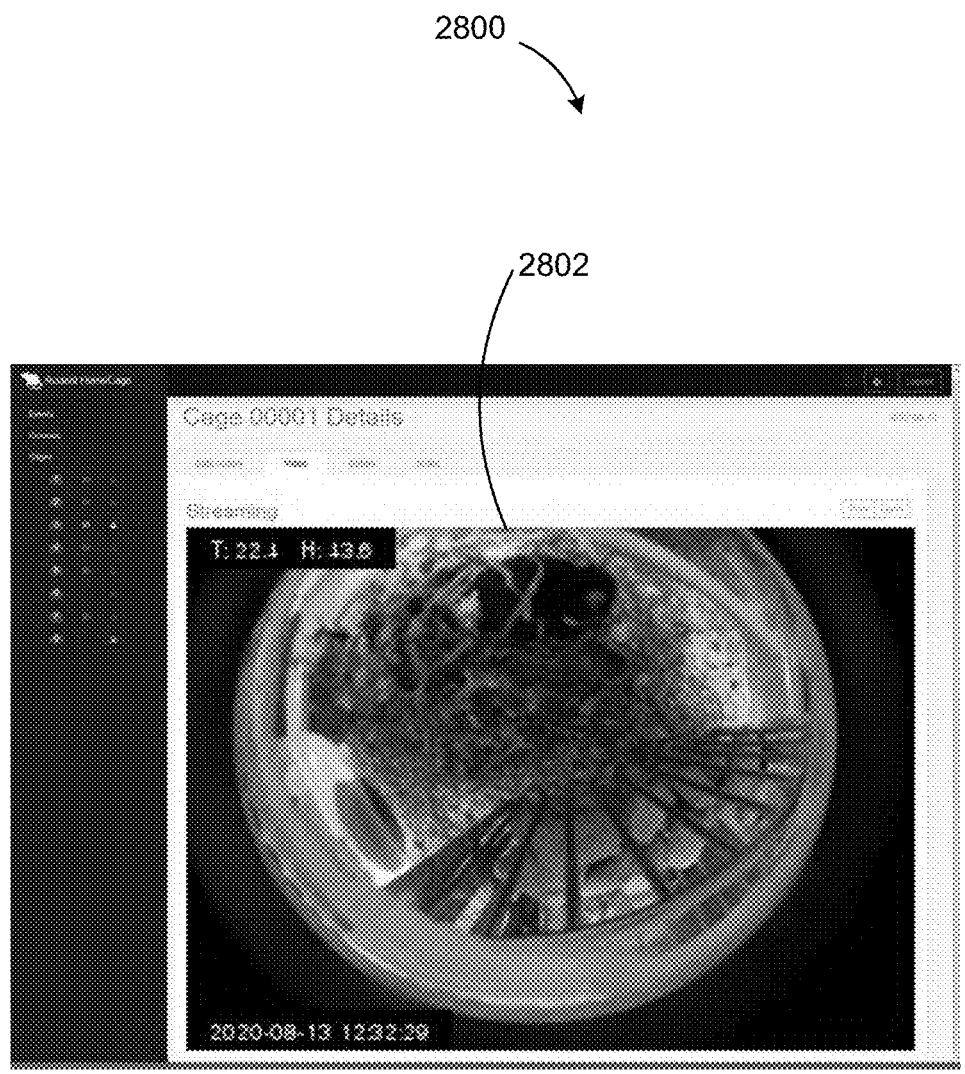

Referring next to FIG. 28, there is shown another user interface 2800 of a homecage monitoring system in accordance with at least one embodiment. Responsive to a selection of the streaming control 2503 (see FIG. 25), a video stream interface 2800 including a video stream 2802 may be viewed by a user for the homecage.

Figure 29:
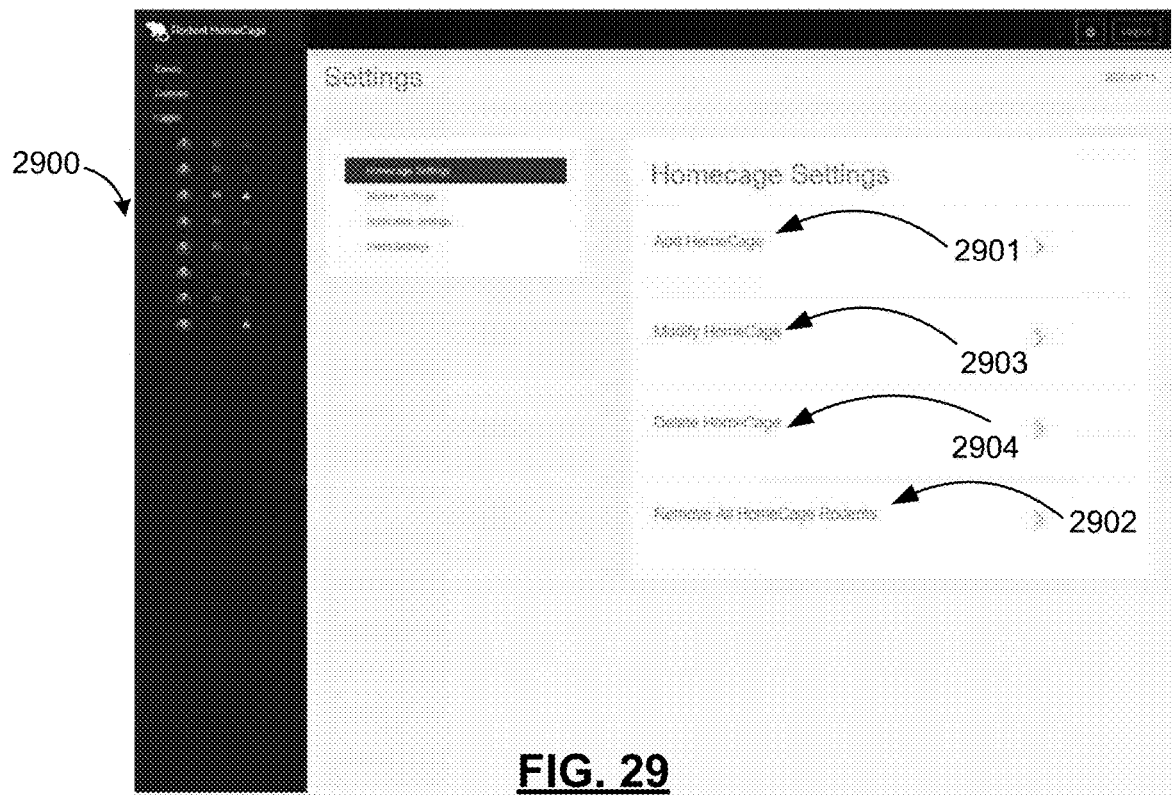

Referring next to FIG. 29, there is shown another user interface 2900 of a homecage monitoring system in accordance with at least one embodiment. The management interface 2900 may allow a user to select an add homecage control 2901, an add animal control 2902, a modify homecage control 2903, and a delete homecage 2904 control.

Figure 30:
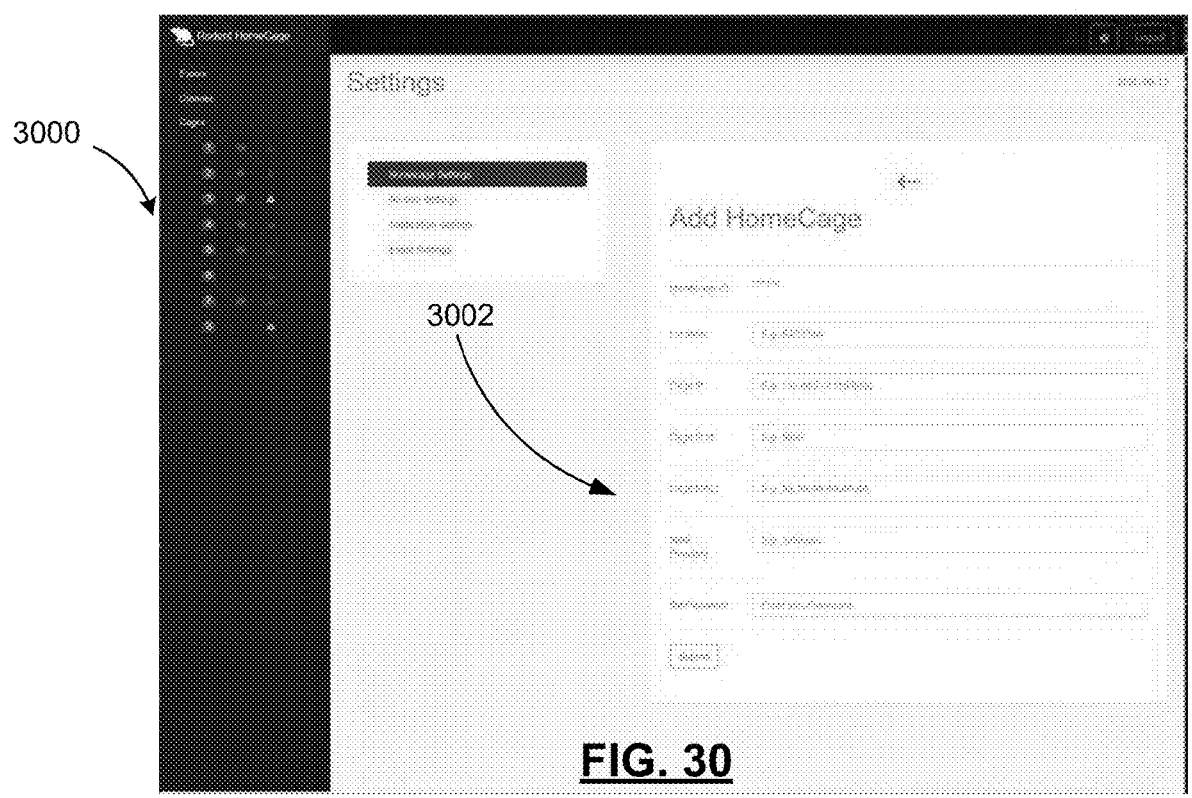

Referring next to FIG. 30, there is shown another user interface 3000 of a homecage monitoring system in accordance with at least one embodiment. Responsive to a user's selection of the add homecage control 2901 (see FIG. 29), an add homecage interface 3000 may be displayed allowing a user to enter information associated with the new homecage.

Figure 31:
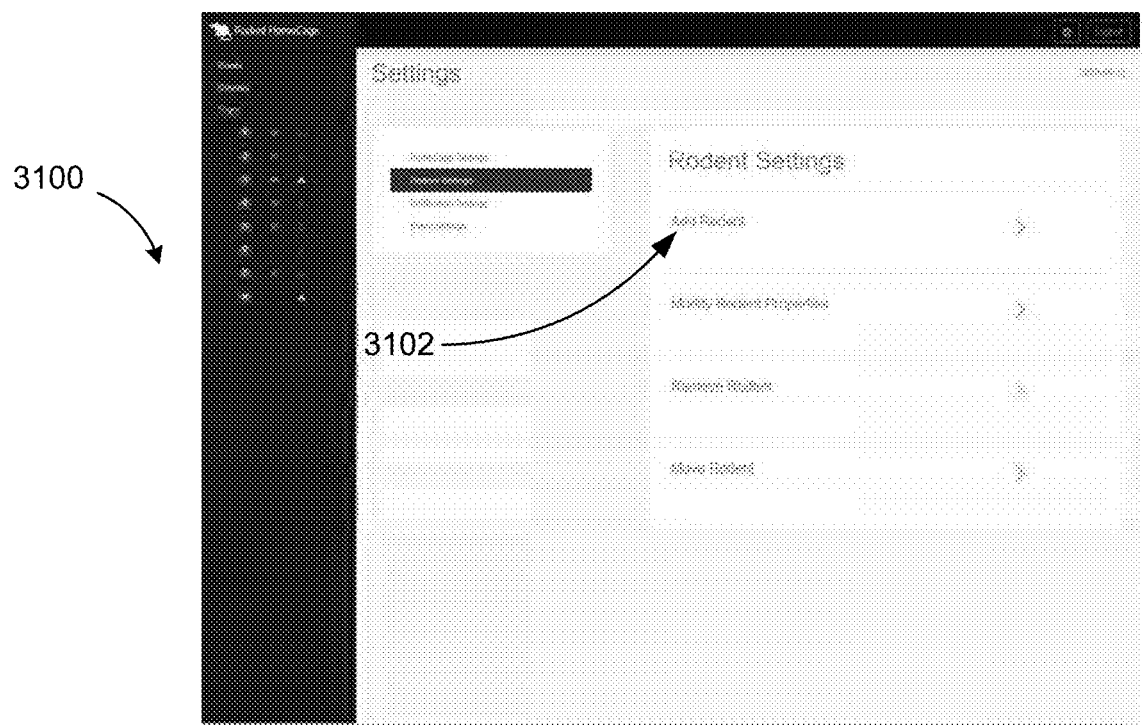

Referring next to FIG. 31, there is shown another user interface 3100 of a homecage monitoring system in accordance with at least one embodiment. Responsive to a user's selection of the add animal control 2902 (see FIG. 29), an add animal interface 3100 may be displayed allowing the user to add an animal and associated parameters to a homecage.

Figure 32:
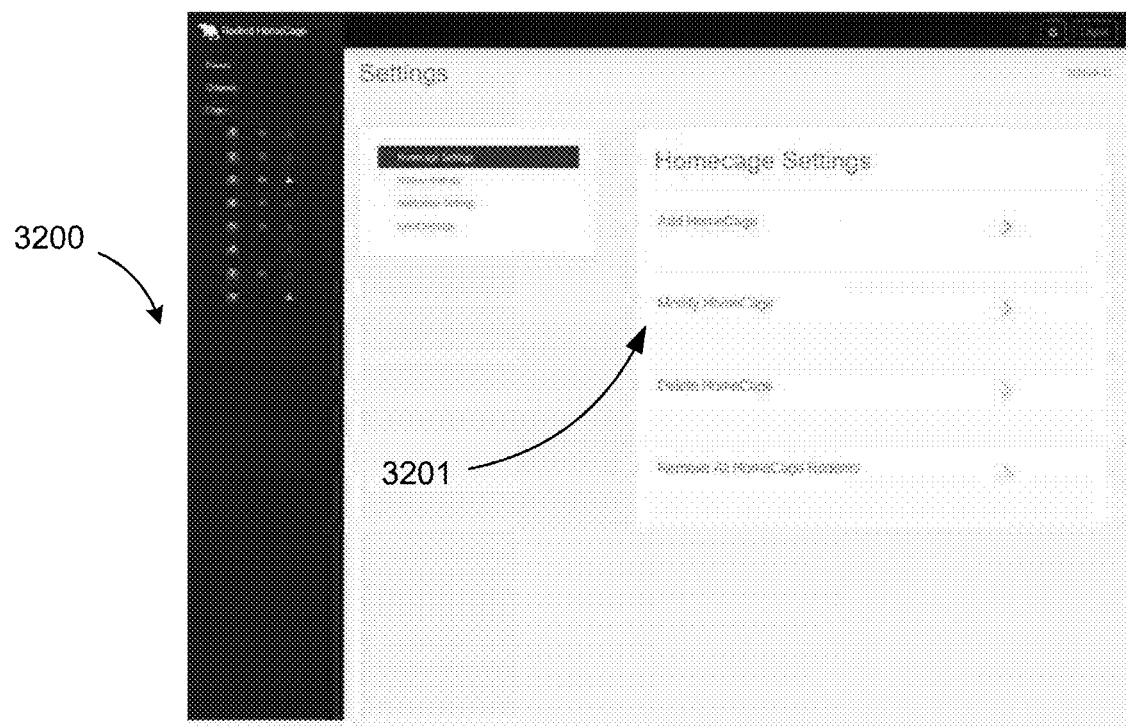

Referring next to FIG. 32, there is shown another user interface 3200 of a homecage monitoring system in accordance with at least one embodiment. Responsive to a user selection of the modify homecage control 2903 (see FIG. 29) a modify homecage interface 3200 may be displayed to allow a user to change parameters associated with a homecage.

Figure 33:
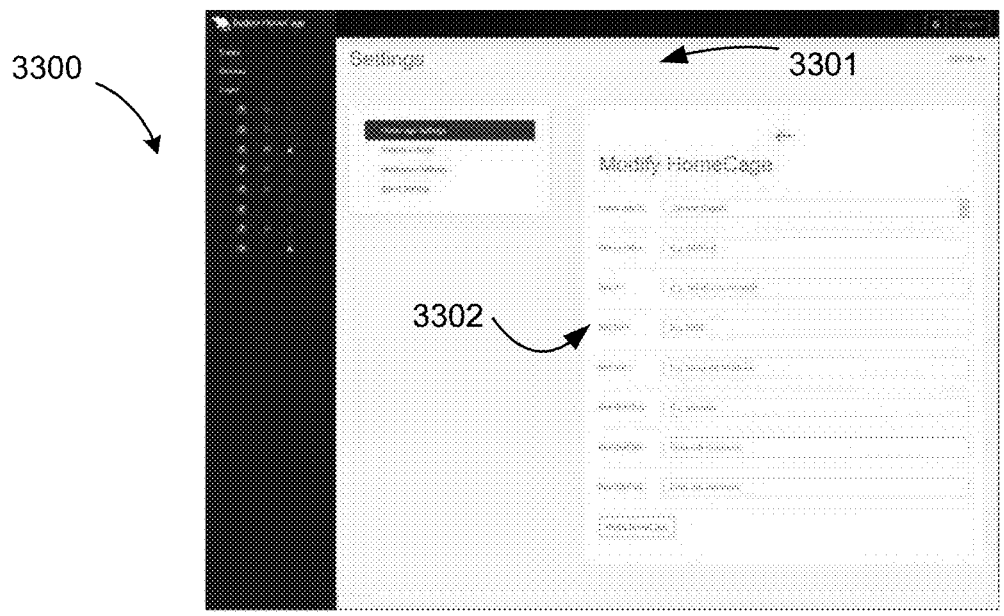

Referring next to FIG. 33, there is shown another user interface 3300 of a homecage monitoring system in accordance with at least one embodiment. Responsive to a user selection of the modify homecage control 2903 (see FIG. 29) another modify homecage interface 3300 may be displayed to allow a user to change parameters associated with a homecage.

Figure 34:
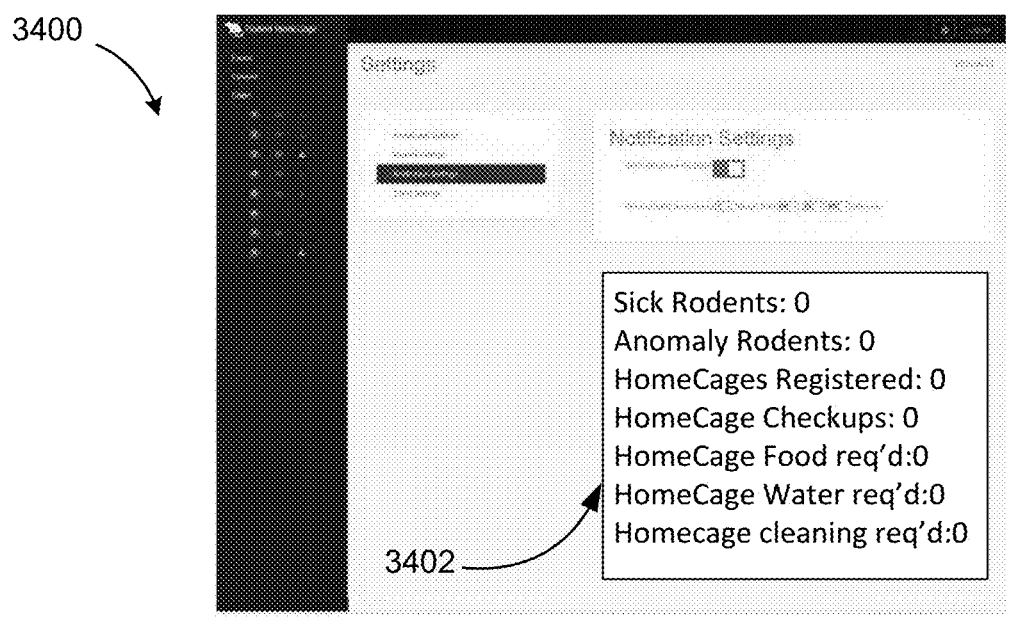

Referring next to FIG. 34, there is shown another user interface 3400 of a homecage monitoring system in accordance with at least one embodiment. A general status page 3402 may be provided to summarize the actions and alerts required for the plurality of homecages, the plurality of colonies, and the plurality of animals monitored using the homecage monitoring system.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

We claim:

1. An automated homecage monitoring system for determining at least a predicted pose and a predicted animal state of at least one animal in the homecage, the homecage system comprising:
a homecage for receiving the at least one animal, operably connected to at least one microcontroller, the at least one microcontroller having at least one sensor for monitoring and collecting data about the at least one animal as sensor input, one of the at least one sensors being a camera for sensing at least one video frame of the animal;
a memory having:
a first predictive model, the first predictive model for predicting a pose estimate of the at least one animal, the first predictive model being a deep neural network; and
a second predictive model, the second predictive model for predicting an animal state, the second predictive model being a recurrent neural network having nodes and transitions for processing the predicted pose estimate and sensor input to predict the animal state;
a processor in communication with the at least one sensor, the memory, and the at least one camera, the processor configured to, in real-time;
receive the sensor input from the at least one sensor and
generate, using the first predictive model, the predicted pose estimate from the sensor input, the predicted animal pose estimates representing a visual feature in the at least one video frame corresponding to a body feature of the animal;
generate, using the nodes and the transitions in the second predictive model, the predicted animal state based on the predicted pose estimate and the sensor input, the animal state including at least one of a behavioral state of the animal, a social state of the animal, a position state of the animal, a sleep state of the animal, and a biological state of the animal, the transitions being triggered by changes in the predicted pose estimate and sensor data to change the predicted animal state;
determine at least one husbandry variable, the at least one husbandry variable comprising a food supply level, a water supply level, a temperature, a humidity value, a bedding quality metric, and a nesting quality metric;
determine a report based on the at least one of the animal state, the pose estimate, and the sensor input, and
output the report to a server by network communication.

2. The system of claim 1, wherein the predicting the pose estimate comprises:
determining a position of an at least one indicia; and
predicting the pose estimate based on the position of the at least one indicia, the sensor input, and the first predictive model.

3. The system of claim 1, further comprising:
a database in communication with the memory.

4. The system of claim 3, wherein the processor is further configured to:
store the report in the database;
wherein the report, the pose estimate, and the position of the at least one indicia correspond to a common timebase.

5. The system of claim 1, wherein the processor is further configured to output the report to a display device.

6. The system of claim 1, wherein the processor is further configured to predict the pose estimate and predict the animal state using an offline process.

7. The system of claim 1, wherein the processor is further configured to determine, for the report, from a common timebase, a start time, an end time, and an elapsed time.

8. The system of claim 7, wherein the processor is further configured to determine, for the report, from the position of the at least one indicia and the pose estimate, an occupancy map having an movement path of the animal.

9. The system of claim 8, wherein the processor is further configured to determine, for the report, a movement speed along the movement path of the animal.

10. The system of claim 1, wherein the processor is further configured to:
    determine an object position from the sensor input, and
    determine, for the report, from object position, the position of the at least one indicia and the pose estimate, an interaction of the animal with the object.

11. The system of claim 1, further comprising:
    an actuator proximate to the animal; and
    wherein the processor is further configured to actuate the actuator if the report has a pre-determined actuation condition.

12. The system of claim 11 wherein the actuator is a haptic device.

13. The system of claim 12 wherein the at least one sensor further comprises at least one of a humidity sensor, at least one of a temperature sensor, and at least one of an ammonium sensor.

14. The system of claim 1 where the at least one camera has an at least one infra-red camera.

* * * * *